(12) United States Patent
Tsukagoshi

(10) Patent No.: US 10,965,971 B2
(45) Date of Patent: Mar. 30, 2021

(54) SERVER DEVICE, METHOD OF TRANSMISSION PROCESSING OF SERVER DEVICE, CLIENT DEVICE, METHOD OF RECEPTION PROCESSING OF CLIENT DEVICE, AND SERVER SYSTEM

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 27 days.

(21) Appl. No.: 16/311,435

(22) PCT Filed: Jul. 4, 2017

(86) PCT No.: PCT/JP2017/024563
§ 371 (c)(1),
(2) Date: Dec. 19, 2018

(87) PCT Pub. No.: WO2018/012355
PCT Pub. Date: Jan. 18, 2018

(65) Prior Publication Data
US 2019/0238898 A1 Aug. 1, 2019

(30) Foreign Application Priority Data
Jul. 13, 2016 (JP) .............................. JP2016-138980

(51) Int. Cl.
*H04N 21/235* (2011.01)
*H04N 7/18* (2006.01)
(Continued)

(52) U.S. Cl.
CPC .............. *H04N 21/235* (2013.01); *H04N 7/18* (2013.01); *H04N 21/2187* (2013.01); *H04N 21/4355* (2013.01); *H04N 21/4728* (2013.01)

(58) Field of Classification Search
CPC ... H04L 67/02; H04L 65/4069; H04L 65/607; H04N 21/23439; H04N 21/235;
(Continued)

(56) References Cited

U.S. PATENT DOCUMENTS 8,643,729 B2 * 2/2014 Wang ................. H04N 5/23216
348/208.1
2002/0071677 A1 6/2002 Sumanaweera
(Continued)

FOREIGN PATENT DOCUMENTS

JP 2002-185954 A 6/2002
JP 2003-37838 A 2/2003
(Continued)

OTHER PUBLICATIONS

Extended European Search Report dated Apr. 17, 2019 in corresponding European Patent Application No. 17827484.1, 8 pages.
(Continued)

*Primary Examiner* — Jungwon Chang
(74) *Attorney, Agent, or Firm* — Oblon, McClelland, Maier & Neustadt, L.L.P.

(57) ABSTRACT

An imaging unit captures an image of a subject to obtain image data. A transmission unit transmits, to a client device, a container in a predetermined format including a video stream configured by the image data obtained by imaging. Capture information indicating an imaging state in the imaging unit is inserted in a layer of the video stream and/or a layer of the container. The capture information is, for example, information regarding an imaging direction of the imaging unit, information regarding a focus distance of the imaging unit, and information regarding a zoom ratio of the imaging unit. The client device can control an imaging state of a server device.

13 Claims, 20 Drawing Sheets

```
Box Type: 'lcib'
Container: User data box ('udta')

aligned(8) class LocationCaptureInformationBox
extends FullBox('lcib', version = 0, 0) {
unsigned int(16)
 latitude;
 longitude;
 elevation;
 time;
 direction;
 H_angle;
 V_angle;
 focus_distance;
 zoom_ratio;
 capture_device_id;
 capture_view_id;
 Server_url;
}
```

(51) Int. Cl.
*H04N 21/4728* (2011.01)
*H04N 21/2187* (2011.01)
*H04N 21/435* (2011.01)

(58) Field of Classification Search
CPC ........... H04N 21/4728; H04N 21/2187; H04N 21/4355; H04N 7/18
See application file for complete search history.

(56) References Cited

U.S. PATENT DOCUMENTS

| | | | |
|---|---|---|---|
| 2004/0207728 A1* | 10/2004 | Kihara | H04N 21/4782 348/143 |
| 2013/0100307 A1 | 4/2013 | Curcio et al. | |
| 2014/0267775 A1* | 9/2014 | Lablans | H04N 5/2624 348/169 |
| 2015/0100702 A1* | 4/2015 | Krishna | H04N 21/23439 709/231 |
| 2015/0172690 A1* | 6/2015 | Tsukagoshi | H04N 21/44026 375/240.26 |
| 2016/0283106 A1* | 9/2016 | Thorne | H04N 5/23216 |
| 2018/0204387 A1* | 7/2018 | Utsugi | G06T 19/00 |

FOREIGN PATENT DOCUMENTS

| | | |
|---|---|---|
| JP | 2004-110277 A | 4/2004 |
| JP | 2005-175758 A | 6/2005 |

OTHER PUBLICATIONS

Sejin Oh et al., "Proposal for Media Orchestration", International Organisation for Standardisation, ISO/IEC JTC1/SC29/WG11; Coding of Moving Pictures and Audio, ISO/IEC JTC1/SC29/WG11 MPEG2016/ m38564, XP030066920, May 23, 2016, 25 pages.

Krishna Chandramouli et al., "A Proposed Solution in Response to CfP for Media Orchestration", International Organisation for Standardisation, ISO/IEC JTC1/SC29/WG11; Coding of Moving Pictures and Audio, ISO/IEC JTC1/SC29/WG11 MPEG2016/ m38557, XP030066913, May 30, 2016, 23 pages.

International Search Report dated Oct. 10, 2017 in PCT/JP2017/024563 filed Jul. 4, 2017.

* cited by examiner

FIG. 3

```
Box Type: 'lcib'
Container: User data box ('udta')

aligned(8) class LocationCaptureInformationBox
extends FullBox('lcib', version = 0, 0) {
unsigned int(16)
latitude;
longitude;
elevation;
time;
direction;
H_angle;
V_angle;
focus_distance;
zoom_ratio;
capture_device_id;
capture_view_id;
Server_url;
}
```

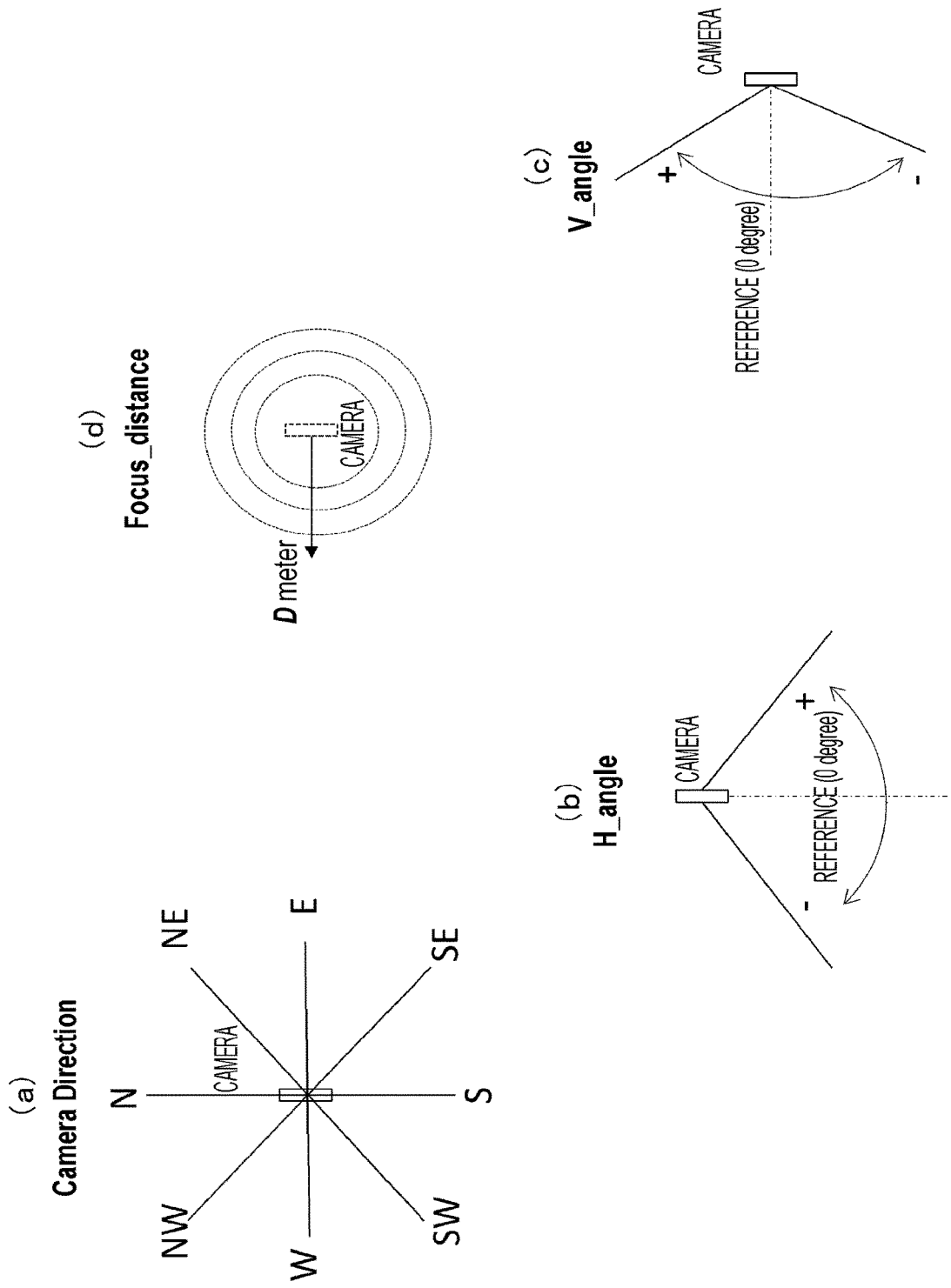

FIG. 5

Location_Capture_information SEI

| Syntax | Size | Type |
|---|---|---|
| Location_Capture_information (){ | | |
|   byte_length | 8 | uimsbf |
|   latitude | 16 | uimsbf |
|   longitude | 16 | uimsbf |
|   elevation | 16 | uimsbf |
|   time | 16 | uimsbf |
|   direction | 16 | uimsbf |
|   H_angle | 16 | uimsbf |
|   V_angle | 16 | uimsbf |
|   focus_distance | 16 | uimsbf |
|   zoom_ratio | 16 | uimsbf |
|   capture_device_id | 16 | uimsbf |
|   capture_view_id | 16 | uimsbf |
|   server_url_text_length | 8 | uimsbf |
|   for ( i = 0 ; i < server_url_text_length ; i++ ){ | | |
|     url_text | 8 | uimsbf |
|   } | | |
| } | | |

FIG. 6

| Syntax | Size | Type |
|---|---|---|
| View_Control_metadata (){ | | |
|    byte_length | 8 | uimsbf |
|    ROI_pointing_flag | 1 | bslbf |
|    view_angle_shift_flag | 1 | bslbf |
|    focus_distance_flag | 1 | bslbf |
|    switch_view_flag | 1 | bslbf |
|    zoom_control_flag | 1 | bslbf |
|    reserved | 3 | '111' |
|    capture_device_ID | 8 | uimsbf |
|    capture_view_ID | 8 | uimsbf |
|    if (ROI_pointing_flag) { | | |
|       ROI_area_top_left_x | 16 | uimsbf |
|       ROI_area_top_left_y | 16 | uimsbf |
|       ROI_area_bottom_right_x | 16 | uimsbf |
|       ROI_area_bottom_right_y | 16 | uimsbf |
|    } | | |
|    else if (view_angle_shift_flag) { | | |
|       Right_shift_degree | 16 | uimsbf |
|       Left_shift_degree | 16 | uimsbf |
|       Upper_shift_degree | 16 | uimsbf |
|       Lower_shift_degree | 16 | uimsbf |
|    } | | |
|    else if (focus_distance_flag) { | | |
|       Focus_distance | 16 | uimsbf |
|    } | | |
|    else if (switch_view_flag) { | | |
|       switch_view | 16 | uimsbf |
|    } | | |
|    else if (zoom_control_flag) { | | |
|       zoom_in_degree | 16 | uimsbf |
|       zoom_out_degree | 16 | uimsbf |
|    } | | |
| } | | |

FIG. 7

| Field | Description |
|---|---|
| capture_device_ID (8) | CAPTURE DEVICE IDENTIFICATION ID |
| capture_view_ID (8) | IDENTIFICATION ID FOR CAPTURED IMAGE VIEW |
| ROI_area_top_left_x (16) | top-left_x COORDINATE OF RECTANGULAR AREA OF OBJECT TO BE TRACKED (Region Of Interest) |
| ROI_area_top_left_y (16) | top-left_y COORDINATE OF RECTANGULAR AREA OF OBJECT TO BE TRACKED (Region Of Interest) |
| ROI_area_bottom_right_x (16) | bottom_right_x COORDINATE OF RECTANGULAR AREA OF OBJECT TO BE TRACKED (Region Of Interest) |
| ROI_area_bottom_right_y (16) | bottom_right_y COORDINATE OF RECTANGULAR AREA OF OBJECT TO BE TRACKED (Region Of Interest) |
| Right_shift_degree (16) | FREQUENCY OF CHANGING ORIENTATION OF CAMERA TO RIGHT AS VIEWED FROM CAMERA POSITION |
| Left_shift_degree (16) | FREQUENCY OF CHANGING ORIENTATION OF CAMERA TO LEFT AS VIEWED FROM CAMERA POSITION |
| Upper_shift_degree (16) | FREQUENCY OF CHANGING ORIENTATION OF CAMERA UPWARD |
| Lower_shift_degree (16) | FREQUENCY OF CHANGING ORIENTATION OF CAMERA DOWNWARD |
| Focus_distance (16) | INDICATING FOCUS DISTANCE IN meter UNIT |
| switch_view (16) | INDICATING CAPTURE VIEW ID FOR CHANGING IMAGING STATE OF CAMERA |
| zoom_in_degree (16) | ENLARGEMENT RATIO (1 + x/100) |
| zoom_out_degree (16) | REDUCTION RATIO (1 − x/100) |

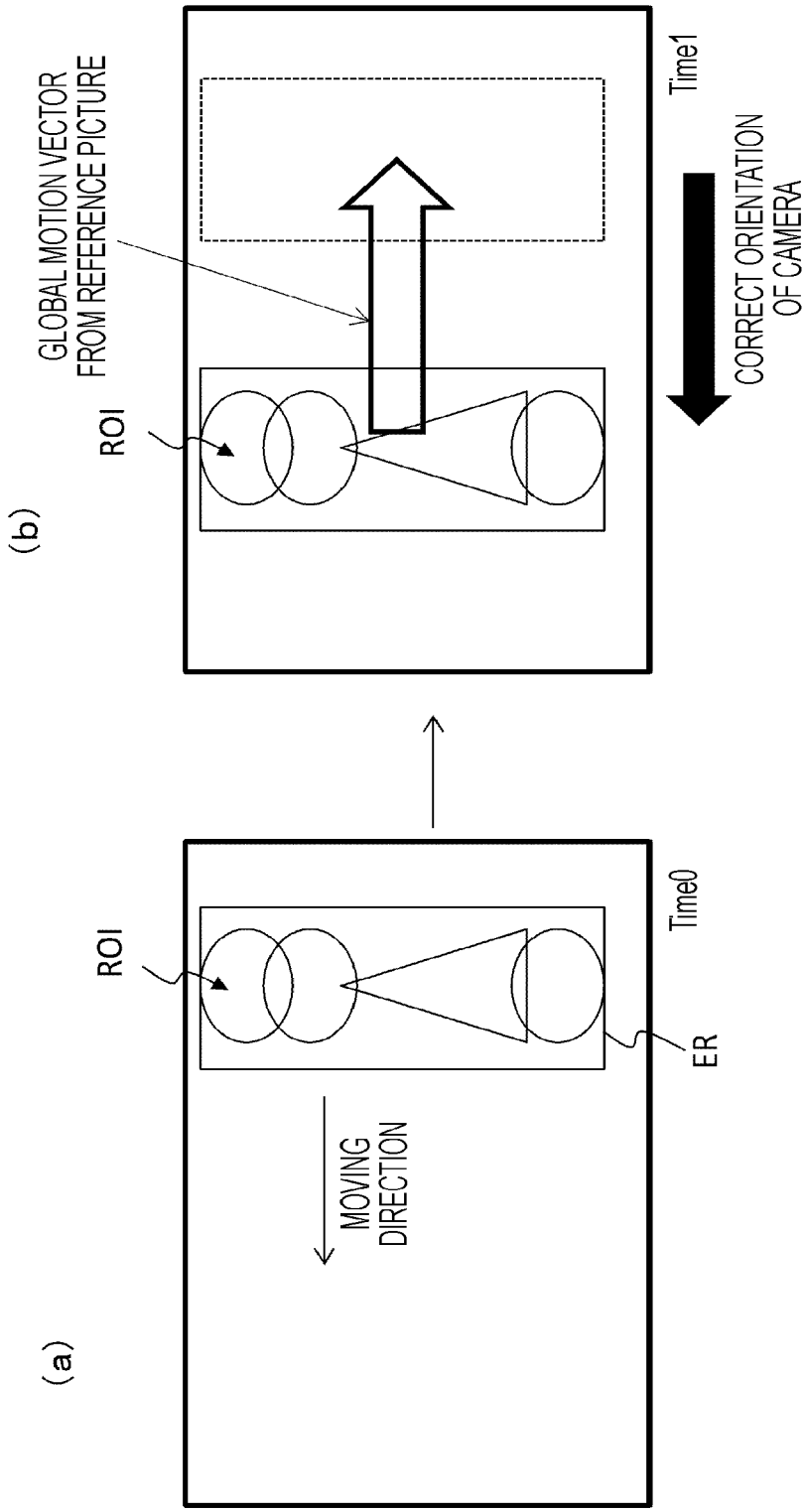

FIG. 10

```
<Period>
    <AdaptationSet mimeType="video/mp4" codecs="hev1.xx.xx.L153">
        <SupplementaryDescriptor schemeIdUri="urn:rmtcst:video:locationgps"
            trkpt lat="36.291597" lon="140.117526"
            ele="67.91"
            time=2012-12-01T00:59:58Z />
        <SupplementaryDescriptor schemeIdUri="urn:rmtcst:video:captureinformation"
            direction=SE H_angle="10" V_angle="-15" focus_distance="5"  />
        <SupplementaryDescriptor schemeIdUri="urn:rmtcst:video:captureserve"
            capturedevice_id="1" captureview_id="1" />
        <SupplementaryDescriptor schemeIdUri="urn:rmtcst:video:captureserverurl"
            serverurl />
        <Representation id=1 >
            <BaseURL>videostream.mp4</BaseURL>
            <SubRepresentation
                width="3840" height="2160" frameRate="60"
                codecs="hev1.xx.xx.L153.xx"
                level="0" />
        </Representation>
    </AdaptationSet>
</Period>
```

FIG. 12
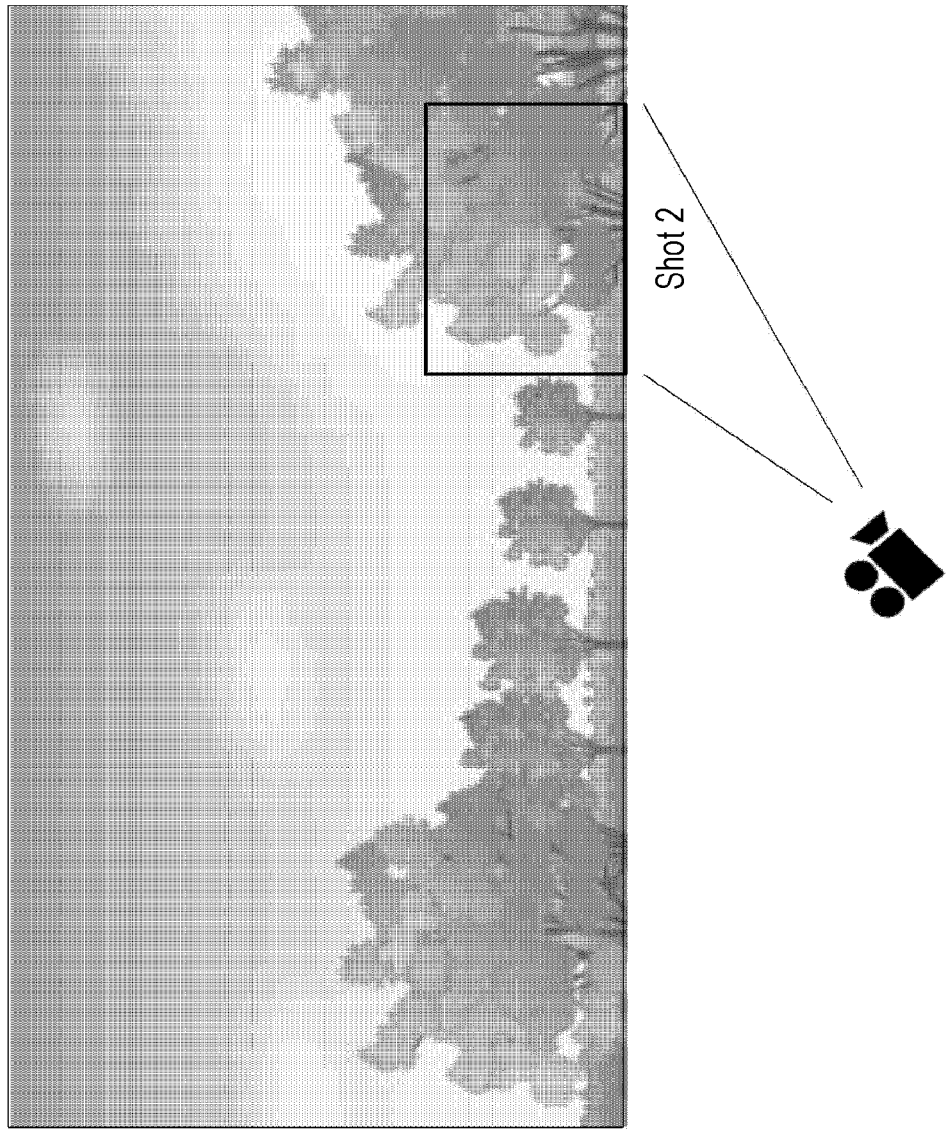
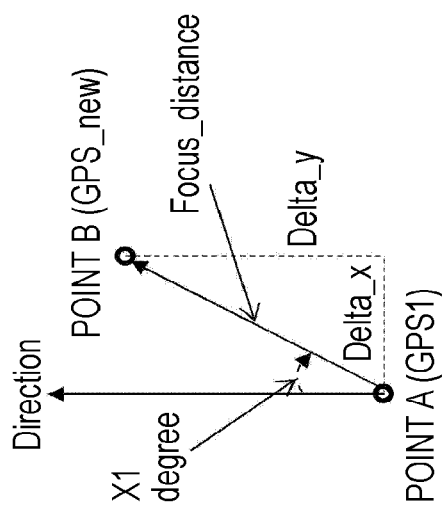

FIG. 15

| Syntax | Size | Type |
|---|---|---|
| Server_access_message(){ | | |
| byte_length | 8 | uimsbf |
| server_url_text_length | 8 | uimsbf |
| for( i = 0 ; i < server_url_text_length ; i++ ){ | | |
| url_text | 8 | uimsbf |
| } | | |
| } | | |

FIG. 16

| Syntax | Size | Type |
|---|---|---|
| Server_access_message(){ | | |
| byte_length | 8 | uimsbf |
| latitude_new | 16 | uimsbf |
| longitude_new | 16 | uimsbf |
| elevation_new | 16 | uimsbf |
| server_url_text_length | 8 | uimsbf |
| for ( i = 0 ; i < server_url_text_length ; i++ ){ | | |
| url_text | 8 | uimsbf |
| } | | |
| } | | |

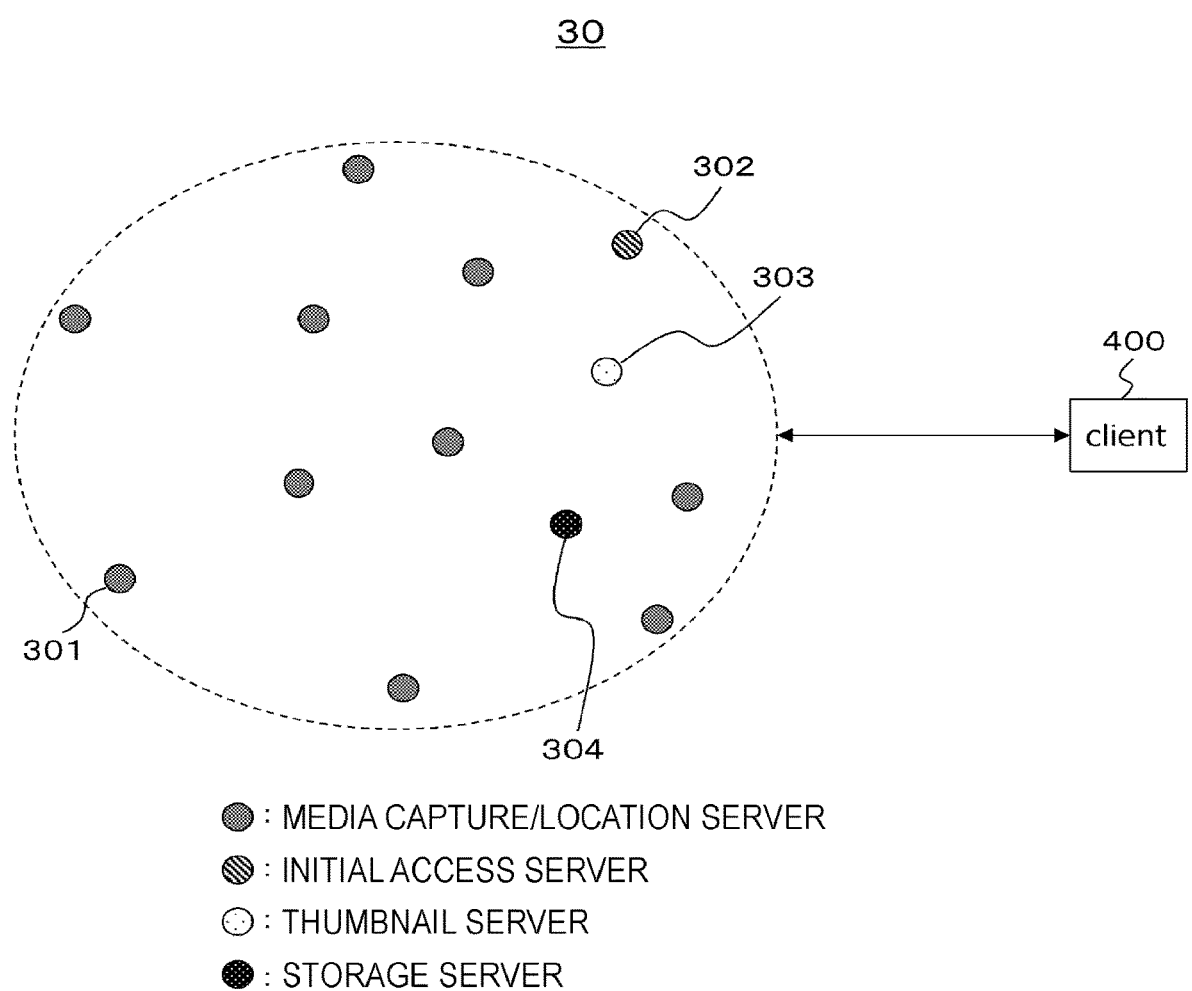

FIG. 19

```
<Period1>
<AdaptationSet mimeType="video/mp4" codecs="hev1.xx.xx.L153"
<Representation id=1 >
    <BaseURL>"thumbnail_server_URL1"</BaseURL>
    SupplementalProperty@capture_device_id11
    SupplementalProperty@capture_view_id11
    SupplementalProperty@capture_device_id12
    SupplementalProperty@capture_view_id12
    SupplementalProperty@capture_device_id13
    SupplementalProperty@capture_view_id13
</Representation>
</AdaptationSet>
</Period1>
<Period2>
<AdaptationSet mimeType="video/mp4" codecs="hev1.xx.xx.L153"
<Representation id=2 >
    <BaseURL>"thumbnail_server_URL2"</BaseURL>
    SupplementalProperty@capture_device_id24
    SupplementalProperty@capture_view_id24
    SupplementalProperty@capture_device_id25
    SupplementalProperty@capture_view_id25
    SupplementalProperty@capture_device_id26
    SupplementalProperty@capture_view_id26
</Representation>
</AdaptationSet>
</Period2>
```

SERVER DEVICE, METHOD OF TRANSMISSION PROCESSING OF SERVER DEVICE, CLIENT DEVICE, METHOD OF RECEPTION PROCESSING OF CLIENT DEVICE, AND SERVER SYSTEM

TECHNICAL FIELD

The present technology relates to a server device, a method of transmission processing of a server device, a client device, a method of reception processing of a client device, and a server system, and more particularly, to a server device and the like suitable for application to a monitoring system, an image distribution system, and the like.

BACKGROUND ART

For example, Patent Document 1 discloses a system that distributes an image content from a distribution server (content providing server) to a client terminal (user terminal) via a network such as the Internet. Furthermore, for example, Patent Document 2 discloses a monitoring system in which a monitoring camera (network camera) is connected to a monitoring device (computer) via a network and monitoring image data is transmitted from the monitoring camera to the monitoring device via the network.

CITATION LIST

Patent Document

Patent Document 1: Japanese Patent Application Laid-Open No. 2004-110277
Patent Document 2: Japanese Patent Application Laid-Open No. 2005-175758

SUMMARY OF THE INVENTION

Problems to be Solved by the Invention

An object of the present technology is to enable a client device to appropriately control an imaging state of a server device.

Solutions to Problems

A concept of the present technology is a server device including:
an imaging unit that captures an image of a subject to obtain image data; and
a transmission unit that transmits a container in a predetermined format including a video stream configured by the image data to a client device, in which
capture information indicating an imaging state in the imaging unit is inserted in a layer of the video stream and/or a layer of the container.

In the present technology, the imaging unit captures an image of the subject to obtain image data. The transmission unit transmits, to the client device, the container in the predetermined format including the video stream configured by the image data obtained by imaging. For example, the container may be MP4 used for distribution using the Internet or the like, or a container in a format other than that. The capture information indicating the imaging state in the imaging unit is inserted in the layer of the video stream and/or the layer of the container. For example, the capture information may include information regarding an imaging direction of the imaging unit. Further, the capture information may include information regarding a focus distance of the imaging unit. Furthermore, the capture information may include information regarding a zoom ratio of the imaging unit.

In this manner, in the present technology, the capture information indicating the imaging state in the imaging unit is inserted in the layer of the video stream and/or the layer of the container. Therefore, the client device can easily grasp the imaging state (e.g., imaging direction, focus distance, and zoom ratio) in the imaging unit of the server device on the basis of the capture information, whereby the imaging state of the server device can be appropriately controlled.

Note that, in the present technology, for example, position information indicating a position of its own server device may be further inserted in the layer of the video stream and/or the layer of the container. For example, the position information may be GPS data. In this case, the client device can easily grasp a position of the server device, that is, latitude, longitude, altitude, an imaging time, and the like of an imaging position on the basis of the position information.

Further, in the present technology, for example, identification information for identifying a combination of the capture information and the position information and identification information for identifying its own server device may be further inserted in the layer of the video stream and/or the layer of the container. In this case, in the client device, the video stream transmitted from the server device can be identified using those identification information.

Furthermore, in the present technology, for example, a reception unit that receives, from the client device, control information for controlling the imaging state in the imaging unit, and a control unit that control the imaging state of the imaging state on the basis of the control information may be further included. In this case, the imaging state (e.g., imaging direction, focus distance, and zoom ratio) in the imaging unit can be set to, using the client device, a state intended by a user of the client device.

Moreover, another concept of the present technology is a client device including:
a reception unit that receives a container in a predetermined format including a video stream from a server device,
the video stream including image data obtained by imaging a subject with an imaging unit,
capture information indicating an imaging state of the imaging unit being inserted in a layer of the video stream and/or a layer of the container,
the client device further including:
a control unit that controls processing for obtaining display image data from the video stream, processing for displaying the imaging state of the imaging unit on the basis of the capture information, processing for obtaining control information regarding the imaging state of the imaging unit in response to a user operation using the display of the imaging state, and processing for transmitting the control information to the server device.

In the present technology, the reception unit receives, from the server device, the container in the predetermined format including the video stream. For example, the container may be MP4 used for distribution using the Internet or the like, or a container in a format other than that. The video stream includes the image data obtained by imaging the subject with the imaging unit, and the capture information indicating the imaging state of the imaging unit is inserted in the layer of the video stream and/or the layer of the container.

The control unit controls the processing for obtaining the display image data from the video stream, the processing for displaying the imaging state of the imaging unit on the basis of the capture information, the processing for obtaining the control information regarding the imaging state of the imaging unit in response to the user operation using the display of the imaging state, and the processing for transmitting the control information to the server device.

In this manner, in the present technology, the control information according to the user operation using the display of the imaging state of the imaging unit based on the capture information inserted in the layer of the video stream and/or the layer of the container is transmitted to the server device. Therefore, the imaging state of the server device can be appropriately controlled, and the image data obtained by imaging in a desired imaging state can be provided and received from the server device.

Note that, in the present technology, for example, the position information indicating a position of the server device may be further inserted in the layer of the video stream and/or the layer of the container, and the control unit may further control processing for obtaining access information for accessing another server device different from the server device mentioned above on the basis of a user operation, and processing for accessing the other server device on the basis of the access information.

For example, the access information may be a URL of the other server device. In this case, the other server device is directly accessed using the URL. Furthermore, for example, the access information may be the position information and an URL of a conversion server that converts the position information into an URL. In this case, the other server device is indirectly accessed via access to the conversion server.

In this manner, the access information for accessing the other server device on the basis of the position information indicating the position of the server device is obtained, whereby processing for accessing the other server device can be easily performed.

Moreover, another concept of the present technology is a server system in which a plurality of server devices and client devices are mutually connected via a network, in which the server device includes:

an imaging unit that captures an image of a subject to obtain image data; and a transmission unit that transmits, to the client device, a container in a predetermined format including a video stream configured by the image data, capture information indicating an imaging state in the imaging unit is inserted in a layer of the video stream and/or a layer of the container, the client device includes:

a reception unit that receives the container in the predetermined format from the server device, and the client device further includes:

a control unit that controls processing for obtaining display image data from the video stream, processing for displaying the imaging state of the imaging unit on the basis of the capture information, processing for obtaining control information regarding the imaging state of the imaging unit according to a user operation using a display of the imaging state, and processing for transmitting the control information to the server device.

For example, position information indicating a position of the server device may be further inserted in the layer of the video stream and/or the layer of the container, and the control unit may further control processing for obtaining access information for accessing another server device different from the server device mentioned above on the basis of the user operation, and processing for accessing the other server device on the basis of the access information.

Moreover, another concept of the present technology is a server device including:

a storage that stores a plurality of video streams identified by capture device identification information for identifying an imaging device and capture view identification information for identifying a combination of position information including time information of the imaging device and imaging state information of the imaging device;

a reception unit that receives, from the client device, a reproduction request in which a video stream to be reproduced is specified by the capture device identification information and the capture view identification information; and a transmission unit that reads the specified video stream from the storage and transmits, to the client device, the container in the predetermined format including the video stream.

In the present technology, a plurality of video streams (video files) are stored in the storage. Each video stream can be identified by the capture device identification information for identifying the imaging device and the capture view identification information for identifying the combination of the position information including the time information of the imaging device and the imaging state information of the imaging device.

The reception unit receives, from the client device, the reproduction request in which the video stream to be reproduced is specified by the capture device identification information and the capture view identification information. The transmission unit reads the specified video stream from the storage, and the container in the predetermined format including the video stream is transmitted to the client device.

In this manner, in the present technology, the client device can specify the video stream to be reproduced using the capture device identification information and the capture view identification information, and the desired video stream can be provided to the client device.

Moreover, another concept of the present technology is a client device including:

a transmission unit that transmits, to a server device, a reproduction request in which a video stream to be reproduced is specified by capture device identification information for identifying an imaging device and capture view identification information for identifying a combination of position information of the imaging device and imaging state information of the imaging device;

a reception unit that receives, from the server device, a container in a predetermined format including the video stream corresponding to the reproduction request; and a processing unit that obtains display image data from the video stream included in the container.

In the present technology, the transmission unit transmits, to the server device, the reproduction request in which the video stream to be reproduced is specified. In this case, the video stream to be reproduced is specified by the capture device identification information for identifying the imaging device and the capture view identification information for identifying the combination of the position information of the imaging device and the imaging state information of the imaging device.

The reception unit receives, from the server device, the container in the predetermined format including the video stream corresponding to the reproduction request. Then, the processing unit obtains the display image data from the video stream included in the container.

In this manner, in the present technology, the reproduction request in which the video stream to be reproduced is specified by the capture device identification information and the capture view identification information is transmitted to the server device, and the desired video stream can be provided and received from the server device.

Effects of the Invention

According to the present technology, the client device can appropriately control the imaging state of the server device. Note that the effects described herein are merely examples and are not limited, and there may be additional effects.

BRIEF DESCRIPTION OF DRAWINGS

FIG. 3 is a diagram illustrating exemplary information stored in a "lcib" box.

FIG. 4 is an explanatory diagram of direction information, focus distance information, horizontal angle information, and vertical angle information as capture information.

FIG. 5 is a diagram illustrating an exemplary structure of a Location Capture information SEI message.

FIG. 6 is a diagram illustrating an exemplary structure of control information (control meta information).

FIG. 7 is a diagram illustrating contents of main information in the exemplary structure of the control information (control meta information).

FIG. 8 is an explanatory diagram of operation of tracking (automatic adaptation).

FIG. 10 is a diagram illustrating an exemplary description of an MPD file including URL information of a media capture/location server to be accessed first.

FIG. 12 is a diagram illustrating an example of specifying, using information associated with a direction and a distance, another media capture/location server with respect to a certain media capture/location server.

FIG. 15 is a diagram illustrating an exemplary structure of a server access message as a first message including URL information.

FIG. 16 is a diagram illustrating an exemplary structure of the server access message as a second message including URL information of a GPS URL mapping server and GPS data.

FIG. 18 is a diagram illustrating an exemplary configuration of a server system according to a second embodiment.

FIG. 19 is a diagram illustrating an exemplary description of an MPD file including information regarding a plurality of video streams stored in a storage server.

MODE FOR CARRYING OUT THE INVENTION

Hereinafter, embodiments for carrying out the present invention (hereinafter referred to as embodiments) will be described. Note that descriptions will be made in the following order.

1. First Embodiment
2. Second Embodiment
3. Variation

1. First Embodiment

[Exemplary Configuration of Server System]

Figure 1:
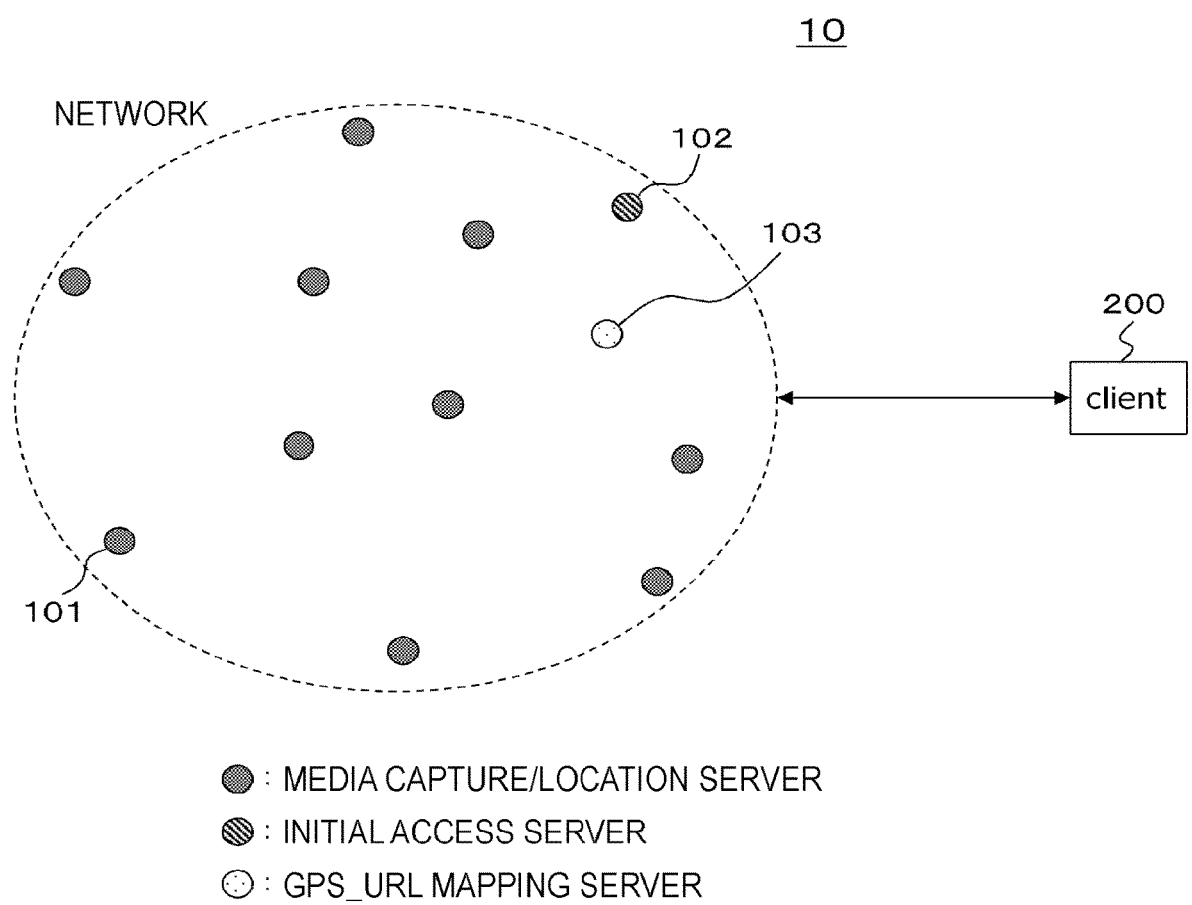
FIG. 1 is a diagram illustrating an exemplary configuration of a server system according to a first embodiment.

FIG. 1 illustrates an exemplary configuration of a server system 10 according to a first embodiment. The server system 10 includes a plurality of server devices and a client device 200, which are mutually connected via a network.

The plurality of server devices include a plurality of media capture/location servers 101, an initial access server 102, and a GPS URL mapping server 103. In a case where there is an access from the client device 200, the media capture/location server 101 transmits, to the client device 200 via the network, a container in a predetermined format including a video stream configured by image data obtained by imaging using a camera (imaging unit), that is, an MP4 distribution stream in the present embodiment.

In this case, information such as capture information indicating an imaging state (e.g., imaging direction, focus distance, and zoom ratio) of the camera (imaging unit), position information indicating a position of its own server device, that is, global positioning system (GPS) data in the present embodiment, identification information for identifying a combination of the capture information and the position information (capture view ID) and identification information for identifying its own server device (capture device ID), and uniform resource locator (URL) of its own server device is inserted in a layer of the video stream and/or a layer of the container.

Figure 2:
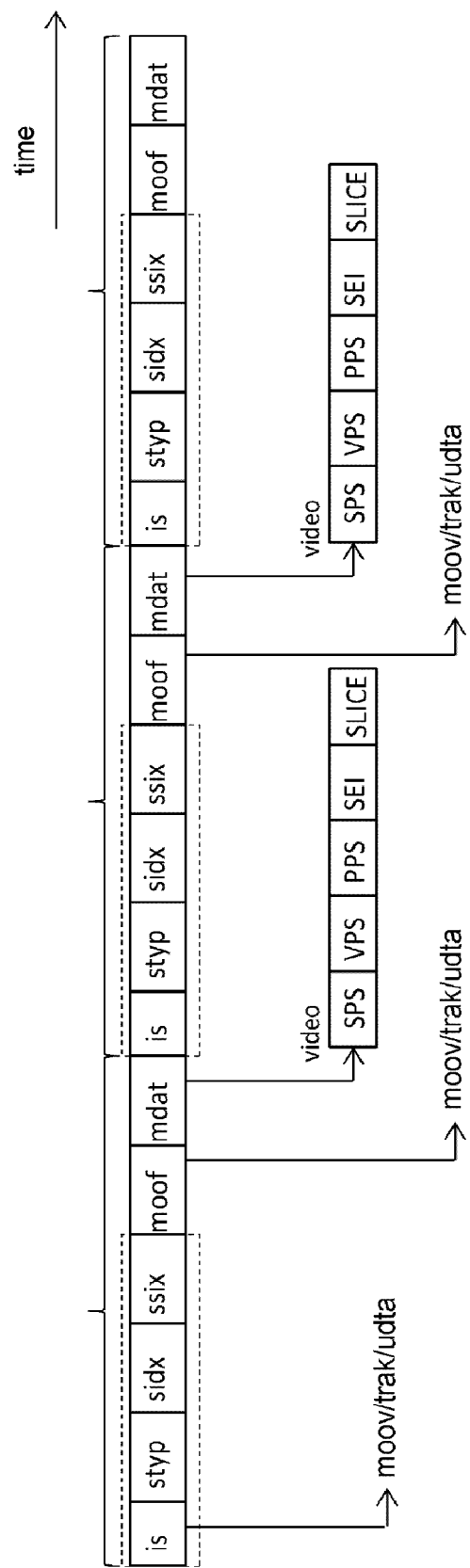
FIG. 2 is a diagram illustrating an exemplary stream of MP4.

For inserting information into the layer of the container, for example, a user data box "udta box" of MP4 is used. FIG. 2 illustrates an exemplary stream of MP4. The entire service stream is fragmented and transmitted so that an image sound comes out from in the middle of transmission in general broadcasting or the like. In this case, as illustrated in the drawing, it is started from an initialization segment (IS), and boxes of "styp", "segment index box (sidx)", "sub-segment index box (ssix)", "movie fragment box (moof)", and "media data box (mdat)" follows thereafter.

The "udta" box is defined in the initialization segment (IS) or the "moof" box as illustrated in the drawing. In other words, there is a "moov" box in the initialization segment (IS) and there is a "trak" box in the "moov" box, the "udta" box is defined in the "trak" box.

In this case, a location capture information box "lcib box" is newly defined in the "udta" box, which is to be newly defined. FIG. 3 illustrates exemplary information stored in the "lcib" box. GPS data includes a "latitude", "longitude", "elevation", and "time". The "latitude" is latitude data, the "longitude" is longitude data, the "elevation" is altitude data, and the "time" is time data.

The capture information includes a "direction", "H_angle", "V_angle", "focus_distance", and "zoom_ratio". As illustrated in FIG. 4(a), the "direction" is direction information such as north, south, east, and west of the camera (imaging unit). As illustrated in FIG. 4(b), the "H_angle" is horizontal angle information in a case where the above-described direction of the camera (imaging unit) is set as a reference (zero degrees). As illustrated in FIG. 4(c), the "V_angle" is vertical angle information in a case where the horizontal position of the camera (imaging unit) is set as a reference (zero degrees). As illustrated in FIG. 4(d), the "focus_distance" is focus distance information of the camera (imaging unit). The "zoom_ratio" is zoom ratio information of the camera (imaging unit).

A "capture_device_id" is a capture device ID. A "capture_view_id" is a capture view ID. A "Server_url" is the URL of its own server device.

Furthermore, an SEI message is used for inserting information into the layer of the video stream, for example. A Location_Capture_information SEI message, which is to be newly defined, is placed in a SEI message group.

FIG. 5 illustrates an exemplary structure (Syntax) of the Location_Capture_information SEI message. The eight-bit field of a "byte_length" indicates a subsequent size (number of bytes) of this SEI message.

Each 16-bit field of the "latitude", "longitude", "elevation", and "time" indicates the GPS data. Here, the "latitude" field indicates latitude, the "longitude" field indicates longitude, the "elevation" field indicates altitude, and the "time" field indicates time.

Each 16-bit field of the "direction", "H_angle", "V_angle", "focus_distance", and "zoom_ratio" indicates capture information. Here, the "direction" field indicates a direction such as north, south, east, and west of the camera (imaging unit). The "H_angle" field indicates a horizontal angle in a case where the above-described direction of the camera (imaging unit) is set as a reference (zero degrees). The "V_angle" field indicates a vertical angle in a case where the horizontal position of the camera (imaging unit) is set as a reference (zero degrees). The "focus_distance" field indicates the focus distance of the camera (imaging unit). The "zoom_ratio" field indicates a zoom ratio of the camera (imaging unit).

The 16-bit field of the "capture_device_id" indicates the capture device ID. The 16-bit field of the "capture_view_id" indicates the capture view ID. The eight-bit field of a "server_url_text_length" indicates a length (size) of a character code portion indicating a character string of a subsequent URL in the number of bytes. The character code is placed in a "url_text" field.

Furthermore, the media capture/location server 101 receives, from the client device 200, control information (control meta information) for controlling the imaging state of the camera (imaging unit), and controls the imaging state of the camera (imaging unit) on the basis of the control information. Accordingly, the imaging state of the camera (imaging unit) of the media capture/location server 101 can be controlled with the client device.

FIG. 6 illustrates an exemplary structure of the control information (control meta information), and FIG. 7 illustrates contents (semantics) of main information in the exemplary structure. The eight-bit field of the "byte_length" indicates a subsequent size (number of bytes) of this control information.

The one-bit field of a "ROI_pointing_flag" is flag information indicating that information regarding a rectangular area of an object to be tracked (region of interest: ROI) exists. The one-bit field of a "view_angle_shift_flag" is flag information indicating that information regarding a view angle shift exists. The one-bit field of a "focus_distance_flag" is flag information indicating that information regarding the focus distance exists. The one-bit field of a "switch_view_flag" is flag information indicating that the capture view ID exists. The one-bit field of a "zoom_control_flag" is flag information indicating that zoom control information exists.

The eight-bit fields of the "capture_device_ID" and the "capture_view_ID" indicate the capture device ID and the capture view ID, respectively, which are identified by the client device 200 on the basis of insertion information of the layer of the video stream and/or the layer of the container ("lcib" box information and Location_Capture_information SEI message).

In a case where the "ROI_pointing flag" is "1", each 16-bit field of a "ROI_area_top_left_x", "ROI_area_top_left_y", "ROI_area_bottom_right_x", and "ROI_area_bottom_right_y" exists. The "ROI_area_top_left_x" field indicates an x-coordinate of a top-left of the rectangular area of the object to be tracked (ROI). The "ROI_area_top_left_y" field indicates a y-coordinate of the top-left of the rectangular area of the object to be tracked (ROI). The "ROI_area_bottom_right_x" field indicates an x-coordinate of a bottom-right of the rectangular area of the object to be tracked (ROI). The "ROI_area_bottom_right_y" field indicates a y-coordinate of the bottom-right of the rectangular area of the object to be tracked (ROI).

In a case where information regarding the rectangular area of the object to be tracked (ROI) exists in the control information (control meta information) received from the client device 200, the media capture/location server 101 controls the imaging state (mainly, direction and angle state) such that the camera (imaging unit) performs tracking (automatic adaptation) of the object (ROI).

FIG. 8 illustrates an exemplary tracking. FIG. 8(a) schematically illustrates an image displayed on a display of the client device 200. In the client device 200, in a case where a user specifies a rectangular area ER surrounding the object to be tracked (ROI) on the display as illustrated in the drawing, the control information (control meta information) having information regarding the rectangular area ER is transmitted from the client device 200 to the media capture/location server 101.

It is assumed that the object to be tracked (ROI) is moving in, for example, the moving direction illustrated in the drawing. In this case, as illustrated in FIG. 8(b), the media capture/location server 101 divides the object to be tracked (ROI) after the movement into blocks, performs motion determination by motion prediction in each block, obtains a global motion vector (moving direction and moving amount) from the motion determination result in each block, and corrects an orientation of the camera (imaging unit) on the basis of the motion vector information.

The media capture/location server 101 repeatedly performs such operation of correcting the orientation of the camera (imaging unit). As a result, the orientation of the camera (imaging unit) is corrected as necessary as the object to be tracked (ROI) moves so that the object to be tracked (ROI) is constantly included in the image, thereby performing the tracking (automatic adaptation).

Returning to FIG. 6, in a case where the "view_angle_shift_flag" is "1", 16-bit fields of a "Right_shift_degree", "Left_shift_degree", "Upper_shift_degree", and "Lower_shift_degree" exist. The "Right_shift_degree" field indicates a frequency of changing the orientation of the camera (imaging unit) rightward as viewed from the camera position. The "Left_shift_degree" field indicates a frequency of changing the orientation of the camera (imaging unit) leftward as viewed from the camera position. The "Upper_shift_degree" field indicates a frequency of changing the orientation of the camera (imaging unit) upward as viewed from the camera position. The "Lower_shift_degree" field indicates a frequency of changing the orientation of the camera (imaging unit) downward as viewed from the camera position.

Figure 9:
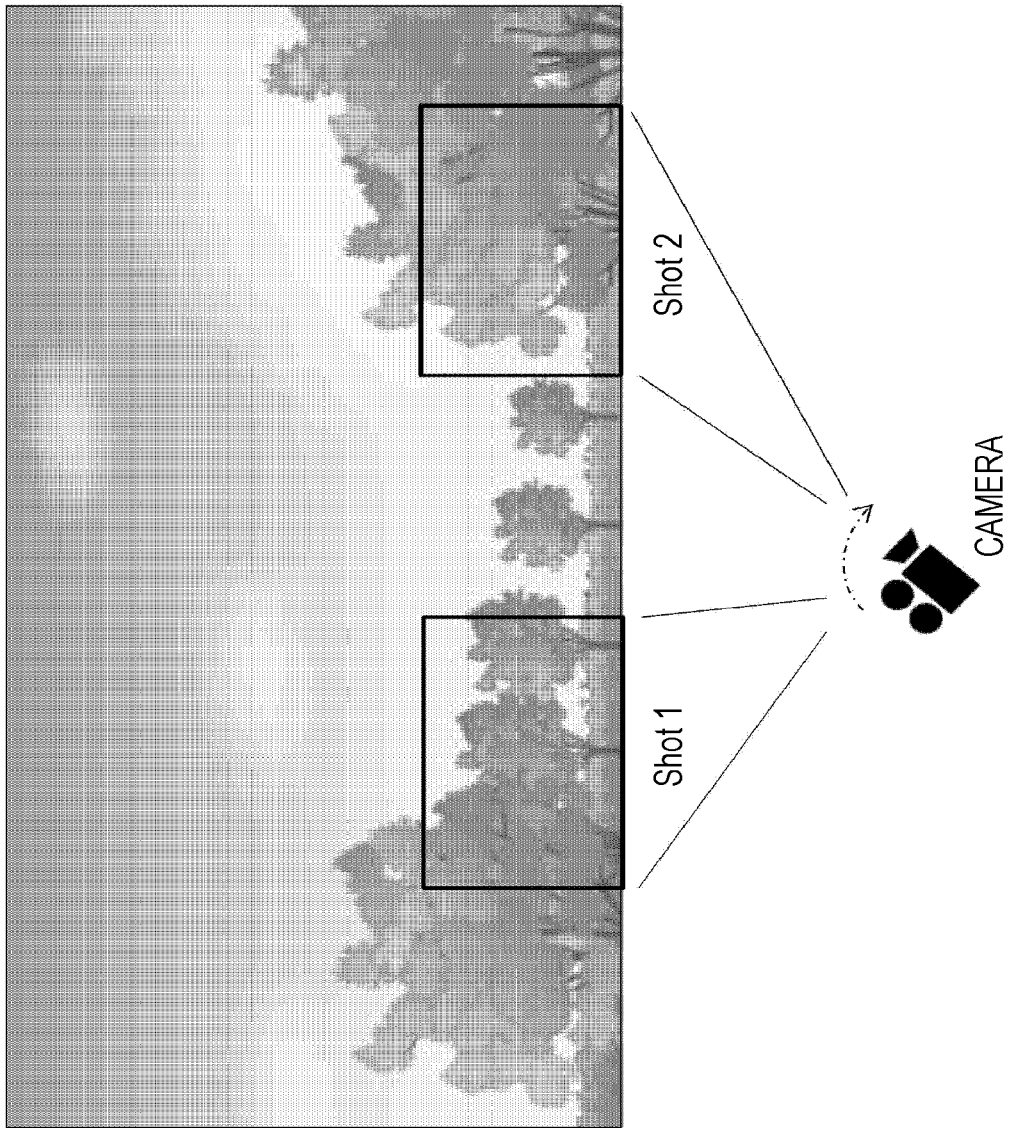
FIG. 9 is an explanatory diagram of control of an imaging state.

In a case where information regarding the view angle shift exists in the control information (control meta information) received from the client device 200, the media capture/location server 101 controls the angle of the camera (imaging unit) on the basis of the information. For example, FIG. 9 illustrates a case where "X" information is provided as the "Right_shift_degree" while the camera (imaging unit) is capturing an image of a Shot 1 portion in the entire subject in a certain imaging state so that the orientation of the camera (imaging unit) is changed rightward by X degrees and is controlled to capture an image of a Shot 2 portion.

In a case where the "focus_distance_flag" is "1", a 16-bit field of the "Focus_distance" exists. The "Focus_distance" field indicates the focus distance in a meter unit. In a case where information regarding the focus distance exists in the control information (control meta information) received from the client device 200, the media capture/location server 101 controls the focus distance of the camera (imaging unit) to correspond to the information.

In a case where the "switch_view_flag" is "1", a 16-bit field of a "switch_view" exists. The "switch_view" field indicates the capture view ID for changing the imaging state of the camera (imaging unit). As described above, the capture view ID is the identification information for identifying a combination of the capture information and the position information. The "switch_view" can be specified in a case where the client device 200 explicitly indicates the capture view ID (capture_view_id) after switching. In a case where the capture view ID exists in the control information (control meta information) received from the client device 200, the media capture/location server 101 controls the imaging state of the camera (imaging unit) to correspond to the capture information indicated by the capture view ID.

In a case where the "zoom_control_flag" is "1", 16-bit fields of a "zoom_in_degree" and "zoom out degree" exist. The "zoom_in_degree" field indicates an x value of an enlargement ratio (1+x/100). The "zoom_out_degree" field indicates an x value of a reduction ratio (1−x/100). In a case where enlargement/reduction information regarding the zoom ratio exists in the control information (control meta information) received from the client device 200, the media capture/location server 101 controls the zoom ratio of the camera (imaging unit) to correspond to the enlargement/reduction information regarding the zoom ratio.

Returning to FIG. 1, the initial access server 102 is a server device being accessed by the client device 200 first, which is for obtaining the URL of the media capture/location server 101 that the client device 200 should first access. Note that, in a case where the client device 200 identifies the URL of the media capture/location server 101 to be accessed first in advance, the initial access server 102 may not be provided.

In a case where there is an access from the client device 200, the initial access server 102 transmits, to the client device 200, a media presentation description (MPD) file including the URL information regarding the media capture/location server 101 to be accessed first.

FIG. 10 illustrates an exemplary description of the MPD file. In this case, an exemplary case where only information associated with the video stream is written is illustrated to simplify descriptions. However, in practice, information associated with media streams other than the video stream is also written.

By the description of "<AdaptationSet mimeType="video/mp4" codecs="hevl.xx.xx.L153"", it is indicated that an adaptation set (AdaptationSet) for the video stream exists, the video stream is supplied in the MP4 file structure, and coded image data of the HEVC of a 153 level exists.

By the description of "<SupplementaryDescriptor schemeIdUri="urn:rmtcst:video:captureinformation" direction=SE H_angle="10" V_angle="−15" focus_distance="5"/>", it is indicated that the direction is "SE", the horizontal angle is 10 degrees, the vertical angle is −15 degrees, and the focus distance is 5 m.

By the description of "<SupplementaryDescriptor schemeIdUri="urn:rmtcst:video:captureserve" capturedevice_id="1" captureview_id="1"/>", it is indicated that the capture device ID is "1", and the capture view ID is "1". By the description of "<SupplementaryDescriptor schemeIdUri="urn:rmtcst:video:captureserverurl" serverurl/>", the URL of the media capture/location server 101 to be accessed first is indicated by the "serverurl".

In this MPD file, a Representation of the video stream indicated by the representation ID (Representation id=1) exists. By the description of "<BaseURL> videostream.mp4</BaseURL>", a location of the video stream is indicated as "videostream.mp4".

In the SubRepresentation in this Representation, the descriptions "width="3840" height="2160" frameRate="60"", "codecs="hevl.xx.xx.L153,xx"", "level="0"" exist. With the descriptions, it is indicated that a stream of 4K 60P is implemented, the level "0" is applied as tag information, and the level of the coded image data of this image is "153".

Returning to FIG. 1, the GPS_URL mapping server 103 converts the GPS data transmitted from the client device 200 into the URL of the corresponding media capture/location server 101, and accesses, instead of the client device 200, the media capture/location server 101 to which the client device 200 is connected using the URL.

As described later, in a case where the client device 200 attempts to switch a connection to another media capture/location server 101 at a position in a desired direction and distance from the position while being connected to a certain media capture/location server 101, GPS data in the vicinity of the position of the other media capture/location server 101 is calculated, and the GPS data is transmitted to the GPS_URL mapping server 103.

Note that, in a case where the client device 200 has a function of converting the GPS data into the URL of the corresponding media capture/location server 101, the GPS URL mapping server 103 may not be provided. In this case, the client device 200 directly accesses the media capture/location server 101 to which the client device 200 is connected using the URL obtained by the conversion.

The client device 200 accesses the initial access server 102, and obtains the URL of the media capture/location server 101 to be accessed first. For example, the client device 200 receives, from the initial access server 102, an MPD file (see FIG. 10) in which the URL of the media capture/location server 101 to be accessed first is written.

The client device 200 accesses the media capture/location server 101 on the basis of the URL of the media capture/location server 101 to be accessed first. Then, the client device 200 receives, from the media capture/location server 101 via the network, the container in the predetermined format including the video stream configured by the image data obtained by the imaging using the imaging unit, that is, the MP4 distribution stream in the present embodiment.

The client device 200 extracts the video stream from the MP4 distribution stream, processes the video stream to obtain display image data, and displays an image based on the display image data (captured image by the media capture/location server 101) on the display.

The client device 200 identifies, from the insertion information of the layer of the video stream and/or the layer of the container ("lcib" box information and Location_Capture_information SEI message), the imaging state (e.g., imaging direction, focus distance, and zoom ratio) of the camera (imaging unit) in the media capture/location server 101. Then, the client device 200 can display, on the basis of a user operation, a user interface screen (UI screen) that shows a current imaging state and has a changing operation unit of the imaging state on the display.

Figure 11:
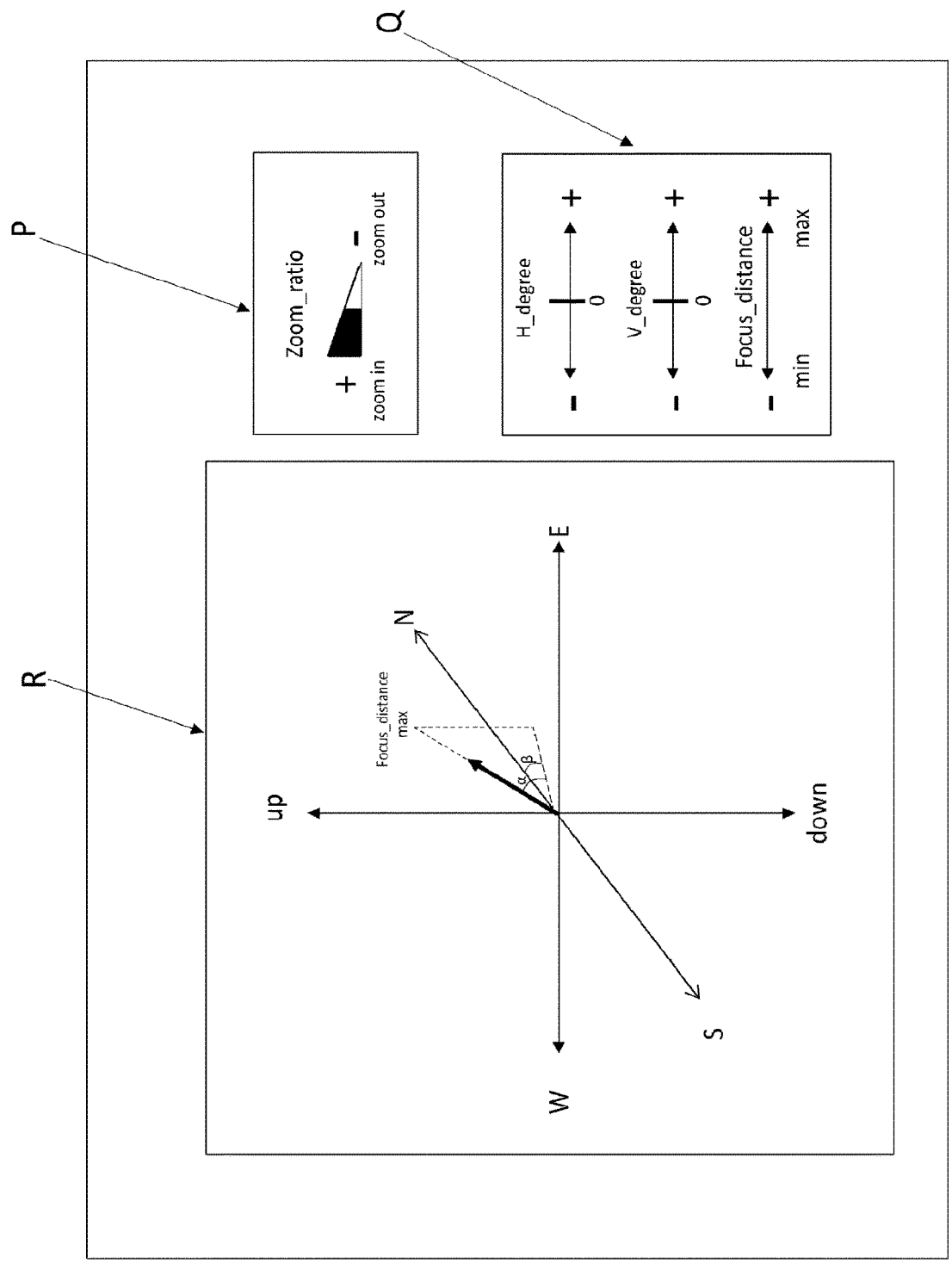
FIG. 11 is a diagram illustrating an exemplary user Interface screen (UI screen) that shows a current imaging state and has a changing operation unit of the imaging state.

FIG. 11 illustrates an exemplary UI screen. The arrow P indicates a zoom ratio display/adjustment unit for displaying a zoom ratio (Zoom_ratio) and adjustment thereof. In the example in the drawing, a current zoom ratio is indicated at the boundary between black and white. For example, the user can perform zoom-in operation by tapping the portion of "+" with a finger, and can perform zoom-out operation by tapping the portion of "−" with the finger. Furthermore, for example, the user can perform zoom ratio adjustment operation by changing the boundary position based on an operation of dragging the finger at the boundary position.

The arrow Q indicates an adjustment unit for adjusting the horizontal angle (H_degree), the vertical angle (V_degree), and the focus distance (Focus_distance). In the example in the drawing, with respect to the horizontal angle (H_degree), the user can change the orientation of the camera (imaging unit) rightward as viewed from the camera position by tapping the portion of "+" with the finger, and can change the orientation of the camera (imaging unit) leftward as viewed from the camera position by tapping the portion of "−" with the finger.

Further, with respect to the vertical angle (V_degree), the user can change the orientation of the camera (imaging unit) upward as viewed from the camera position by tapping the portion of "+" with the finger, and can change the orientation of the camera (imaging unit) downward as viewed from the camera position by tapping the portion of "−" with the finger. Furthermore, with respect to the focus distance (Focus_distance), the user can lengthen the focus distance by tapping the portion of "+" with the finger, and can shorten the focus distance by tapping the portion of "−" with the finger.

The arrow R indicates a display unit for displaying the horizontal angle (H_degree), the vertical degree (V_degree), and the focus distance (Focus_distance). In the example in the drawing, the orientation of the camera (imaging unit) is illustrated in the direction of the thick black arrow, the horizontal angle is in the direction deviated rightward from the north (N) direction by $\beta$ degrees, and the vertical angle is in the direction deviated upward from the horizontal position by $\alpha$ degrees. Furthermore, in the example in the drawing, the focus distance of the camera (imaging unit) is indicated by a length of the thick black arrow.

Note that, in the exemplary UI screen in FIG. 11, only the portion for displaying and adjusting the imaging state is illustrated to simplify the drawing. In response to the selection operation made by the user, this display may be in a state of being superimposed on the image (captured image by the media capture/location server 101).

In a case where the changing operation of the zoom ratio (Zoom_ratio) is performed, the "zoom_control_flag" is set to "1", and 16-bit fields of the "zoom_in_degree" and the "zoom_out_degree" exist in the control information (control meta information) transmitted from the client device 200 to the media capture/location server 101 (see FIG. 6).

Further, in a case where the changing operation of the horizontal angle (H_degree) and the vertical angle (V_degree) is performed, the "view_angle_shift_flag" is set to "1", and 16-bit fields of the "Right_shift_degree", "Left_shift_degree", "Upper_shift_degree", and "Lower_shift_degree" exist in the control information (control meta information) transmitted from the client device 200 to the media capture/location server 101 (see FIG. 6).

Furthermore, in a case where the changing operation of the focus distance (Focus_distance) is performed, the "focus_distance_flag" is set to "1", and the 16-bit field of the "Focus_distance" exists in the control information (control meta information) transmitted from the client device 200 to the media capture/location server 101 (see FIG. 6).

Note that, in the descriptions above, it is indicated that the user can change each element of the imaging state of the camera (imaging unit) with reference to the UI screen. However, with the client device 200, the user can also collectively change the respective elements of the imaging state by specifying the capture view ID.

For example, in a case where the client device 200 accesses the media capture/location server 101 to receive the MP4 distribution stream including the video stream via the network, in response to the user operation, the capture view ID indicating the imaging state together with the capture device ID can be stored in such a manner that, for example, text information or thumbnail information for identifying imaging contents is added thereto. In a case where the user specifies the capture view ID and collectively change the respective elements of the imaging state, the capture view ID indicating the desired imaging state can be efficiently performed by referring to the text information, the thumbnail information, and the like.

In a case where the changing operation of the imaging state is performed using the capture device ID, the "switch_view_flag" is set to "1", and the 16-bit field of the "switch_view" exists in the control information (control meta information) (see FIG. 6) transmitted from the client device 200 to the media capture/location server 101.

In a case where the user performs the operation for changing the connection to another media capture/location server 101 while being connected to a certain media capture/location server 101, the client device 200 accesses the other media capture/location server 101. In this case, the user can specify the other media capture/location server 101 with the capture device ID. In this case, the client device 200 accesses the other media capture/location server 101 using the URL in association with the capture device ID on a one-to-one basis.

Furthermore, the user can specify another media capture/location server 101 with information regarding a direction and a distance relative to a certain media capture/location server 101. In this case, the client device 200 calculates GPS data in the vicinity of the position of the other media capture/location server 101 on the basis of GPS data of a certain media capture/location server 101 and the information regarding the direction and the distance, and transmits the GPS data to the GPS_URL mapping server 103.

In this case, the GPS_URL mapping server 103 converts the GPS data transmitted from the client device 200 to the URL of the corresponding media capture/location server 101, and accesses, instead of the client device 200, the media capture/location server 101 to which the client device 200 is connected using the URL.

Note that, in a case where the client device 200 has the function of converting the calculated GPS data into the URL of the corresponding media capture/location server 101, the client device 200 itself convers the GPS data into the URL of the corresponding media capture/location server 101, and directly accesses the media capture/location server 101.

The user can also give information regarding a current orientation of the camera (imaging unit) as direction information and give focus distance information as distance information. FIG. 12 illustrates a state where the camera (imaging unit) is capturing an image of the Shot 2 portion. In this imaging state, the horizontal angle is in the direction deviated by an X1 degree rightward with the direction (Direction) of the camera (imaging unit) as a reference. Note that the vertical angle is at the horizontal position, for example.

In this case, in a case where GPS information of a current point A (atitude 1, longitude 1, elevation 1, time 1) is obtained, GPS information of a point B is calculated as (latitude_new, longitude_new, elevation_new) from the information regarding the direction and the distance. Here, latitude_new=latitude 1+delta_x, longitude_new=longitude 1+delta_y, and elevation_new=elevation 1+delta_e.

Figure 13:
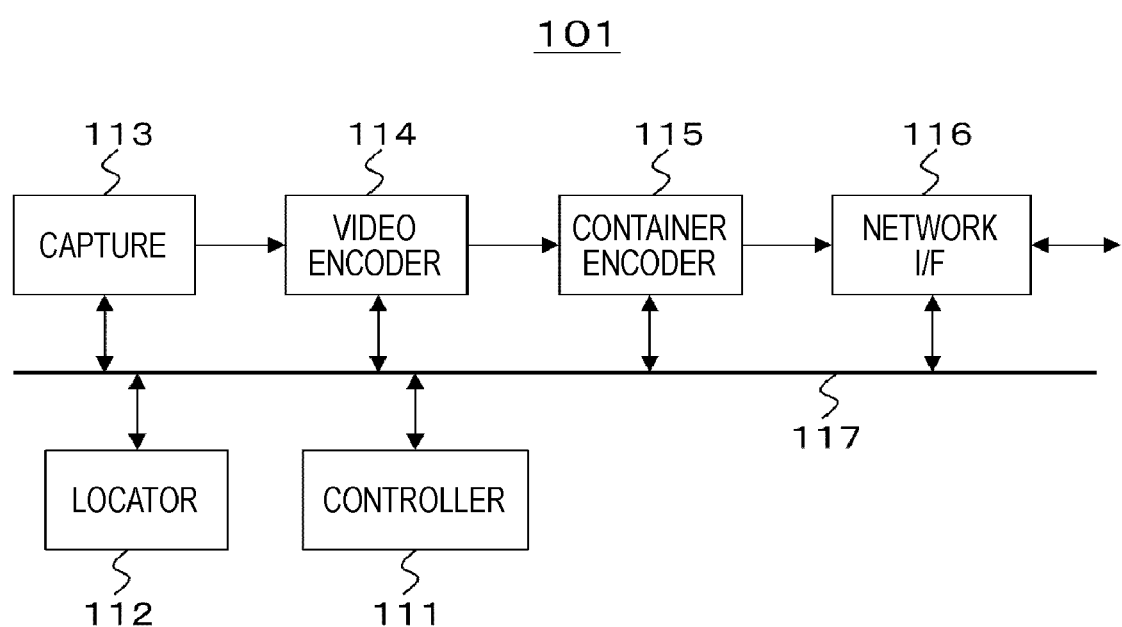
FIG. 13 is a block diagram illustrating an exemplary configuration of the media capture/location server.

FIG. 13 illustrates an exemplary configuration of the media capture/location server 101. The media capture/location server 101 includes a controller 111, a locator 112, a capture 103, a video encoder 114, a container encoder 115, and a network interface 116. Respective units are connected by a bus 117.

The controller 111 controls operation of each part of the media capture/location server 101. The locator 112 receives radio waves from a GPS satellite and obtains position information (longitude/latitude/altitude). The capture 113 is a camera (imaging unit) that captures an image of a subject and obtains image data. The video encoder 114 performs coding such as HEVC on the image data obtained by the capture 113 to obtain encoded image data, and generates a video stream including the coded image data. In this case, the video encoder 114 places the Location_Capture_information SEI message (see FIG. 5) in a SEI message group of the "SEIs" of an access unit (AU).

In the SEI message, the capture information indicating the imaging state (e.g., imaging direction, focus distance, and zoom ratio) of the camera (imaging unit), the position information (GPS data) indicating the position of its own server device, the identification information for identifying the combination of the capture information and the position information (capture view ID) and the identification information for identifying its own server device (capture device ID), the URL of its own server device, and the like are inserted.

The container encoder 115 generates a container including the video stream generated by the video encoder 114, that is, an MP4 stream in this case, as a distribution stream. In this case, the container encoder 115 defines the location capture information box "lcib box" (see FIG. 3) in the "udta" box defined in the initialization segment (IS) or the "moof" box.

In this box, the capture information indicating the imaging state (e.g., imaging direction, focus distance, and zoom ratio) of the camera (imaging unit), the position information (GPS data) indicating the position of its own server device, the identification information for identifying the combination of the capture information and the position information (capture view ID) and the identification information for identifying its own server device (capture device ID), the URL of its own server device, and the like are inserted.

Note that the placement of the Location_Capture_information SEI message and the placement of the location capture information box are not necessarily required both, and either one of them may be adopted.

The network interface 116 communicates with, via the network, the client device 200, and also with another server as necessary. For example, the network interface 116 transmits the distribution stream obtained by the container encoder 115 to the client device 200. Furthermore, for example, the network interface 116 receives the control information (control meta information) (see FIG. 6) transmitted from the client device 200. In this case, the controller 111 controls a state of the capture 113 according to the contents of the control information (control meta information).

Figure 14:
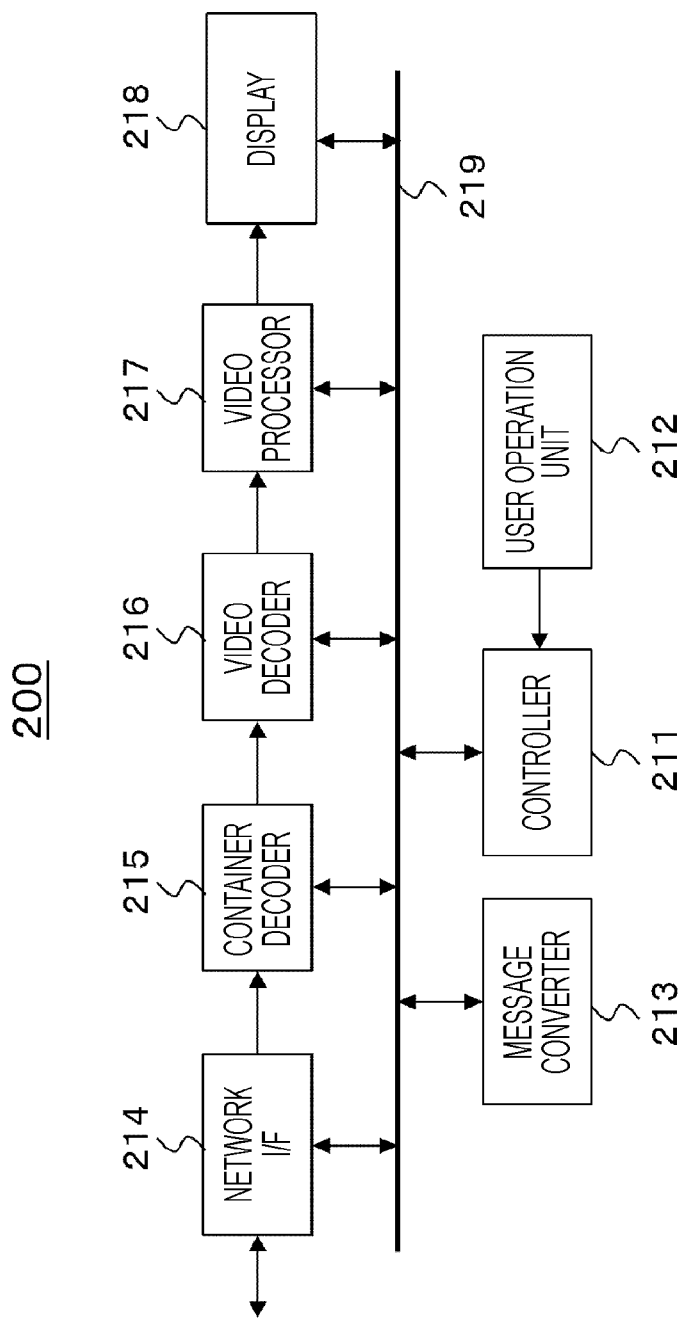
FIG. 14 is a block diagram illustrating an exemplary configuration of a client device.

FIG. 14 illustrates an exemplary configuration of the client device 200. A controller 211, a user operation unit 212, a message converter 213, a network interface 214, a container decoder 215, a video decoder 216, a video processor 217, and a display 218 are included. Respective units are connected by a bus 219.

The controller 211 controls operation of each part of the client device 200. The user operation unit 212 constitutes a user interface, which is a key, a touch panel, a remote controller, and the like with which the user performs various operations. The network interface 214 communicates with a server such as the media capture/location server 101 via the network.

For example, the network interface 214 receives, from the media capture/location server 101, the MP4 stream including the video stream as a distribution stream. Further, in a case where the user performs operation to change the imaging state of the camera (imaging unit) in the currently connected media capture/location server 101, for example, the network interface 214 transmits the control information (control meta information) (see FIG. 6) to the media capture/location server 101.

Furthermore, in a case where the user performs operation to switch the connection from the currently connected media capture/location server 101 to another media capture/location server 101, the network interface 214 transmits the GPS data to the GPS_URL mapping server 103, or directly accesses the media capture/location server 101.

The container decoder 215 extracts the video stream from the distribution stream (MP4 stream) received by the network interface 214. In this case, the container decoder 215 extracts the location capture information box "lcib box" existing in the "udta" box defined in the initialization segment (IS) or the "moof" box, and transmits it to the controller 211. With this operation, the controller 211 identifies the imaging state (e.g., imaging direction, focus distance, and zoom ratio) and the like of the camera (imaging unit).

The video decoder 216 decodes the video stream extracted by the container decoder 215 to obtain display image data. In this case, the video decoder 216 extracts a parameter set and an SEI message inserted in the video stream, and transmits them to the controller 211. This extracted information also includes the Location_Capture_information SEI message. With this operation, the controller 211 identifies the imaging state (e.g., imaging direction, focus distance, and zoom ratio) and the like of the camera (imaging unit).

The video processor 217 performs processing such as resolution conversion on the display image data obtained by the video decoder 216, and then supplies it to the display 218. The display 218 displays an image (captured image by the media capture/location server 101) based on the display image data obtained by the video decoder 216. The display of the image may also be performed by another display monitor via the interface.

As described above, the controller 211 identifies, for example, the imaging state (e.g., imaging direction, focus distance, and zoom ratio) of the camera (imaging unit) from the location capture information box and the Location_Capture_information SEI message, whereby the UI screen (see FIG. 11) showing the current imaging state can be displayed on the display 218 under the control of the controller 211.

The message converter 213 generates, under the control of the controller 211, a message in response to the operation of the user operation unit 212, for example, and transmits it to the network interface 214. For example, in a case where the user performs operation to change the imaging state of the camera (imaging unit) in the currently connected media capture/location server 101, for example, the message converter 213 generates, under the control of the controller 211, the control information (control meta information) (see FIG. 6), and transmits it to the network interface 214.

Furthermore, for example, in a case where the user performs operation to switch the connection from the currently connected media capture/location server 101 to another media capture/location server 101, the message converter 213 generates a first message including the URL information regarding the other media capture/location server 101 or a second message including GPS data for obtaining the URL of the other media capture/location server 101 different from the URL information regarding the GPS_URL mapping server 103, and transmits it to the network interface 214.

FIG. 15 illustrates an exemplary structure of a server access message (Server_access_message) as a first message. The eight-bit field of a "byte_length" indicates a subsequent size (number of bytes) of this SEI message. The eight-bit field of a "server_url_text_length" indicates a length (size) of a character code portion indicating a character string of a subsequent URL in the number of bytes. The character code is placed in a "url_text" field.

FIG. 16 illustrates an exemplary structure of the server access message (Server_access_message) as a second message. The eight-bit field of a "byte_length" indicates a subsequent size (number of bytes) of this SEI message. GPS data includes a "latitude_new", "longitude_new", and "elevation_new". The "latitude_new" is latitude data, the "longitude_new" is longitude data, and the "elevation_new" is altitude data. The eight-bit field of a "server_url_text_length" indicates a length (size) of a character code portion indicating a character string of a subsequent URL in the number of bytes. The character code is placed in a "url_text" field.

Figure 17:
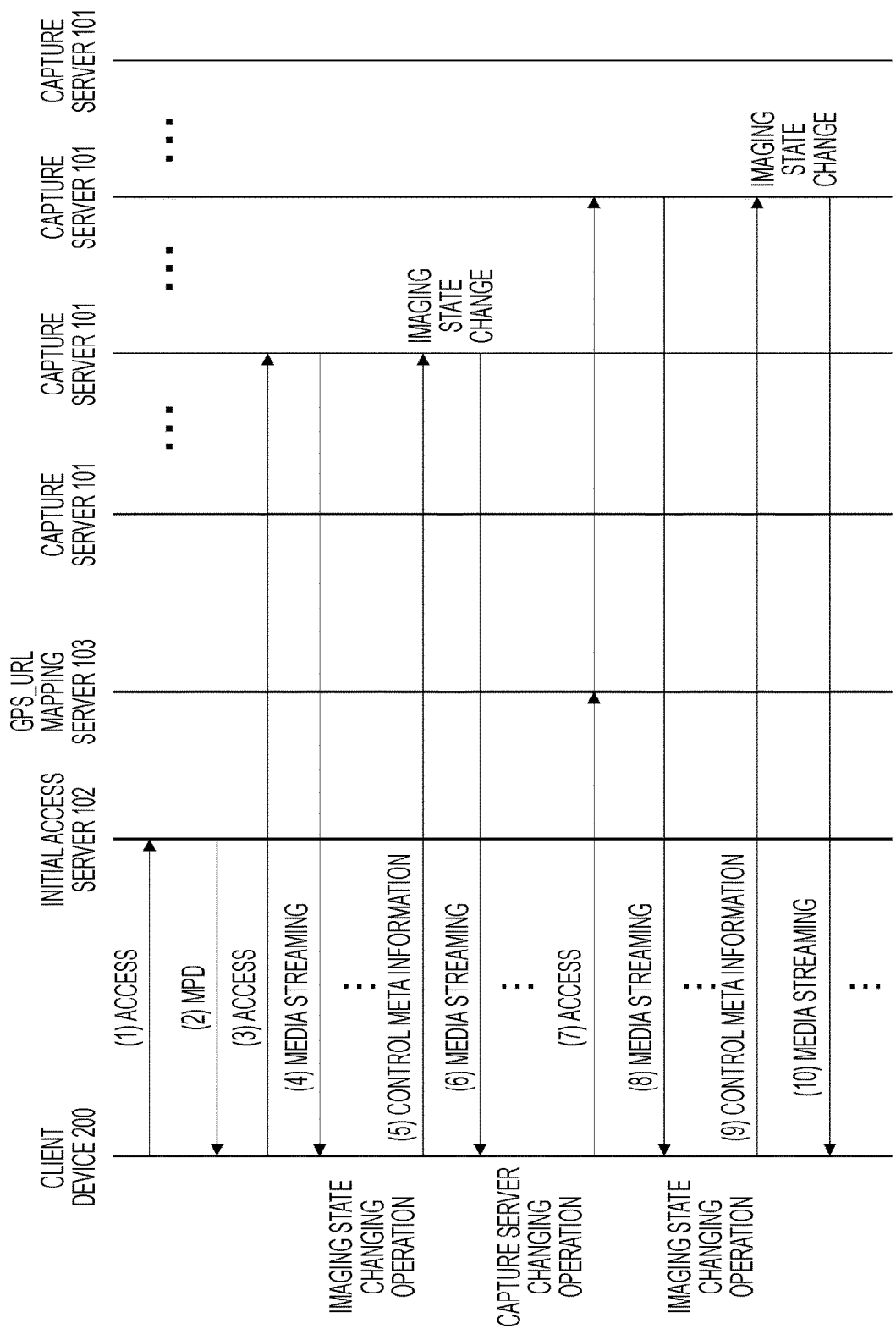
FIG. 17 is a sequence diagram illustrating exemplary communication between the client device and each server.

A sequence diagram in FIG. 17 illustrates exemplary communication between the client device 200 and each server. (1) First, the client device 200 accesses the initial access server 102. Note that the client device 200 is assumed to identify the URL of the initial access server 102 in advance. (2) The initial access server 102 transmits, to the client device 200, an MPD file including the URL information regarding the media capture/location server 101 to be accessed first.

(3) The client device 200 accesses the media capture/location server (capture server) 101 to be accessed first on the basis of the URL information included in the MPD file, and enters a connected state. (4) The media capture/location server 101 transmits, to the client device 200, the distribution stream including the video stream of the captured image data. With this operation, the client device 200 enters a state of displaying the captured image in the media capture/location server 101.

(5) The client device 200 transmits the control information (control meta information) to the media capture/location server 101 in response to an imaging state changing operation made by the user. Accordingly, the imaging state in the media capture/location server 101 is changed. (6) The media capture/location server 101 transmits, to the client device 200, the distribution stream including the video stream of the captured image data after the imaging state change. With this operation, the client device 200 enters a state of displaying the captured image after the imaging state change in the media capture/location server 101.

(7) The client device 200 accesses another media capture/location server 101 directly or via the GPS URL mapping server 103 in response to an operation for changing the connection to the other media capture/location server 101 made by the user, and enters the connected state. (8) The media capture/location server 101 transmits, to the client device 200, the distribution stream including the video stream of the captured image data. With this operation, the client device 200 enters a state of displaying the captured image in the other media capture/location server 101.

(9) The client device 200 transmits the control information (control meta information) to the other media capture/location server 101 in response to the imaging state changing operation made by the user. Accordingly, the imaging state in the other media capture/location server 101 is changed. (10) The media capture/location server 101 transmits, to the client device 200, the distribution stream including the video stream of the captured image data after the imaging state change. With this operation, the client device 200 enters a state of displaying the captured image after the imaging state change in the other media capture/location server 101.

As described above, in the server system 10 illustrated in FIG. 1, the media capture/location server 101 inserts the capture information indicating the imaging state of the camera (imaging unit) into the layer of the video stream and/or the layer of the container, and transmits the same. Therefore, the client device 200 can easily grasp the imaging state (e.g., imaging direction, focus distance, and zoom ratio) of the camera (imaging unit) in the media capture/location server 101 on the basis of the capture information, whereby the imaging state of the media capture/location server 101 can be appropriately controlled.

Furthermore, in the server system 10 illustrated in FIG. 1, the user can specify another media capture/location server 101 with information regarding a direction and a distance relative to the currently connected media capture/location server 101 using the client device 200. Therefore, even in a case where the URL of the media capture/location server 101 to be switched is unknown, switching to another media capture/location server 101 can be appropriately performed.

2. Second Embodiment

[Exemplary Configuration of Server System]

FIG. 18 illustrates an exemplary configuration of a server system 30 according to a second embodiment. The server system 30 includes a plurality of server devices and a client device 400, which are mutually connected via a network.

The plurality of server devices include a plurality of media capture/location servers 301, an initial access server 302, a thumbnail server 303, and a storage server 304. In a case where there is an access to the storage server 304 from, for example, the storage server 304 or automatically, the media capture/location server 301 transmits, via the network, a container in a predetermined format including a video stream configured by image data obtained by imaging using a camera (imaging unit), that is, an MP4 distribution stream in the present embodiment. Although a case of one storage server 304 is illustrated in the example in the drawing, a plurality of storage servers 304 may exist.

Although detailed descriptions are omitted, the media capture/location server 301 is configured in a similar manner to the media capture/location server 101 (see FIG. 13) according to the first embodiment described above. The storage server 304 stores a video stream (video file) transmitted from each media capture/location server 301 with a combination of a capture view ID and a capture device ID serving as identification information.

The initial access server 302 is a server device for obtaining information regarding a plurality of video streams stored in the storage server 304. In a case where there is an access from the client device 400, the initial access server 302 transmits, to the client device 400, a media presentation description (MPD) file including the information regarding the plurality of video streams.

This MPD file includes, as the information regarding the plurality of video streams, the combination of the capture device ID and the capture view ID as identification information of each video stream, and an URL of a thumbnail server for obtaining thumbnail image data of each video stream.

FIG. 19 illustrates an exemplary description of the MPD file. In this case, an exemplary case where only information associated with the video stream is written is illustrated to simplify descriptions. However, in practice, information associated with media streams other than the video stream is also written.

There are information regarding a first period (Period 1) and information regarding a second period (Period 2). In the first period (Period 1), by the description of "<AdaptationSet mimeType="video/mp4" codecs="hevl.xx.xx.L153"", it is indicated that an adaptation set (AdaptationSet) for the video stream exists, the video stream is supplied in the MP4 file structure, and coded image data of the HEVC of a 153 level exists.

By the description of "<BaseURL>"thumbnail_server_URL1" </BaseURL>", it is indicated that a location of thumbnail image data of each video stream stored in the storage server 304 identified by the following combination of the capture device ID and the capture view ID is "thumbnail_server_URL1". In the thumbnail server indicated by the "thumbnail_server_URL1", individual thumbnail images are managed to correspond to the capture device IDs and the capture view IDs.

Furthermore, in the second period (Period 2), by the description of "<AdaptationSet mimeType="video/mp4" codecs="hevl.xx.xx.L153"", it is indicated that the adaptation set (AdaptationSet) for the video stream exists, the video stream is supplied in the MP4 file structure, and the coded image data of the HEVC of the 153 level exists.

By the description of "<BaseURL>"thumbnail_server_URL2" </BaseURL>", it is indicated that the location of the thumbnail image data of each video stream stored in the storage server 304 identified by the following combination of the capture device ID and the capture view ID is "thumbnail_server_URL2". In the thumbnail server indicated by the "thumbnail_server_URL2", individual thumbnail images are managed to correspond to the capture device IDs and the capture view IDs. Note that the location of the thumbnail image data in the first period (Period 1) and the second period (Period 2) may be the same.

Returning to FIG. 18, the thumbnail server 303 holds one or more thumbnail image data of each video stream stored in the storage server 304. In a case where there is an access from the client device 400, the thumbnail server 303 transmits the held thumbnail image data to the client device 400. Note that, although a case of one thumbnail server 303 is illustrated in the example in the drawing, a plurality of thumbnail servers 303 may exist.

Although detailed descriptions are omitted, the client device 400 is configured in a similar manner to the client device 200 (see FIG. 14) according to the first embodiment described above. The client device 400 accesses the initial access server 302, and obtains the information regarding the plurality of video streams stored in the storage server 304. This client device 400 receives, from the initial access server 302, for example, the MPD file in which the combination of the capture device ID and the capture view ID as the identification information of each video stream and the URL of the thumbnail server for obtaining the thumbnail image data of each video stream are written (see FIG. 19).

The client device 400 accesses the thumbnail server 303 on the basis of the URL of the thumbnail server. Then, the client device 400 receives, from the thumbnail server 303 via the network, the thumbnail image data of the plurality of video streams stored in the storage server 304. Note that information regarding an imaging start time and an imaging end time of each video stream may be added to each thumbnail image data.

The client device 200 displays a thumbnail image for convenience of selection of a reproduction video stream by the user. At this time, the imaging start time and the imaging end time may be displayed in association with each thumbnail image so that the user can not only select the reproduction video stream but also specify a reproduction start position thereof.

In a case where the reproduction video stream is selected by a user operation, the client device 400 transmits, to the storage server 304, a reproduction request including the combination of the capture device ID and the capture view ID for identifying the reproduction video stream. Then, the client device 400 receives, from the storage server 304, an MP4 distribution stream including the selected reproduction video stream via the network. Note that, in a case where the reproduction start position is also specified by the user operation, the reception from the storage server 304 starts at the reproduction start position.

The client device 400 extracts the video stream from the MP4 distribution stream, processes the video stream to obtain display image data, and displays an image based on the display image data (captured image by the media capture/location server 301) on the display.

Figure 20:
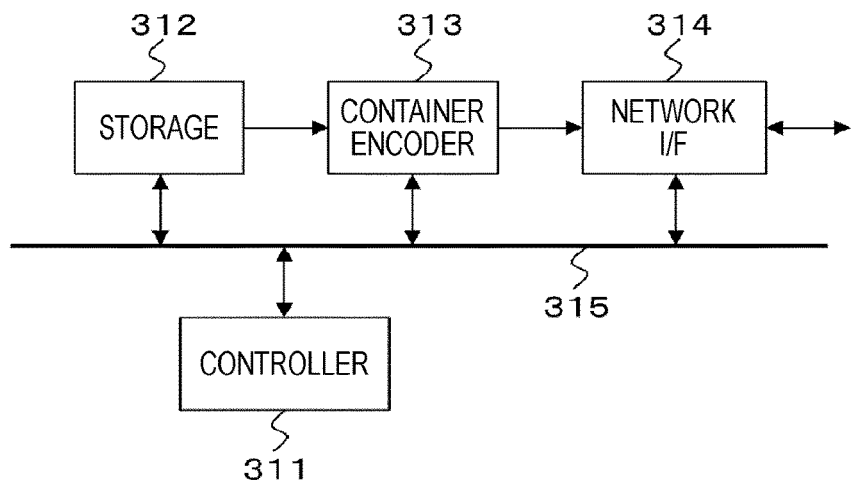
FIG. 20 is a block diagram illustrating an exemplary configuration of the storage server.

FIG. 20 illustrates an exemplary configuration of the storage server 304. This storage server 304 includes a controller 311, a storage 312, a container encoder 313, and a network interface 314. Respective units are connected by a bus 315.

The controller 311 controls operation of each part of the storage server 304. The storage 312 includes a hard disk drive (HDD), a semiconductor memory, and the like. The storage 312 stores a video stream (video file) transmitted from each media capture/location server 301 with a combination of a capture view ID and a capture device ID serving as identification information.

In a case where the reproduction request in which the video stream to be reproduced is specified by the combination of the capture device ID and the capture view ID is received from the client device 400, the controller 311 reads the video stream (video file) identified by the combination of the capture device ID and the capture view ID from the storage 312, and transmits it to the container encoder 313. Note that, in a case where the specification of the reproduction start position is also included in the reproduction request, the reading starts at the reproduction start position.

The container encoder 313 generates a container including the video stream read from the storage 312, that is, an MP4 stream in this case, as a distribution stream. The network interface 314 communicates with, via the network, the client device 400, and also with another server as necessary.

For example, the network interface 314 receives a video stream transmitted from each media capture/location server 301. Further, for example, the network interface 314 transmits the distribution stream obtained by the container encoder 313 to the client device 400. Furthermore, for example, the network interface 314 receives the reproduction request transmitted from the client device 400.

Figure 21:
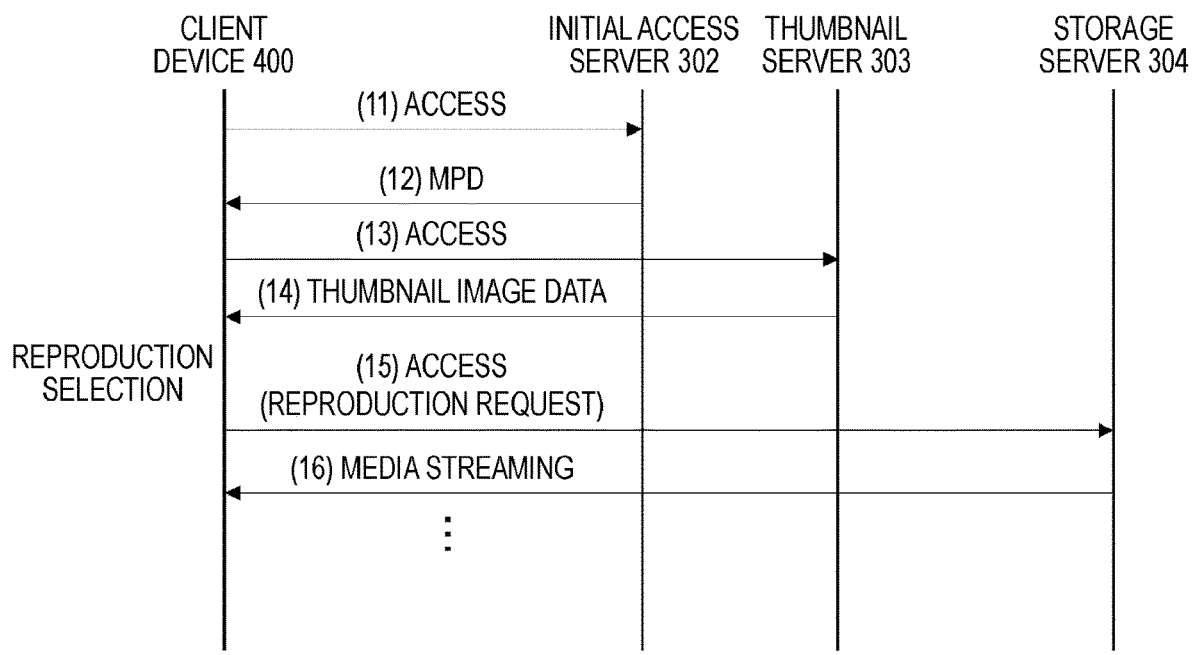
FIG. 21 is another sequence diagram illustrating exemplary communication between the client device and each server.

A sequence diagram in FIG. 21 illustrates exemplary communication between the client device 400 and each server. (11) First, the client device 400 accesses the initial access server 302. Note that the client device 400 is assumed to identify the URL of the initial access server 302 in advance. (12) In a case where there is an access from the client device 400, the initial access server 302 transmits, to the client device 400, the MPD file including the information regarding the plurality of video streams.

(13) The client device 400 accesses the thumbnail server 303 on the basis of the URL information regarding the thumbnail server included in the MPD file, and enters the connected state. (14) The thumbnail server 303 transmits the thumbnail image data to the client device 400. Accordingly, the client device 400 enters a state of displaying the thumbnail image data of the plurality of video streams stored in the storage server 304 on the display for convenience of selection of the reproduction video stream.

(15) In a case where the reproduction video stream is selected by the user operation, the client device 400 transmits, to the storage server 304, the combination of the capture device ID and the capture view ID for identifying the reproduction video stream. (16) Then, the client device 400 receives, from the storage server 304, the MP4 distribution stream including the selected reproduction video stream via the network. Accordingly, the client device 400 enters a state of displaying the image based on the reproduction video stream.

As described above, in the server system 30 illustrated in FIG. 18, in a case where the reproduction video stream is selected by the user operation, the client device 400 transmits, to the storage server 304, the reproduction request including the combination of the capture device ID and the capture view ID for identifying the reproduction video stream. Therefore, the client device 400 can appropriately receive a desired video stream from the storage server 304.

Furthermore, in the server system 30 illustrated in FIG. 18, the user can select the reproduction video stream on the basis of the thumbnail image using the client device 400, and the selection of the reproduction video stream can be easily and appropriately performed.

3. Variation

Note that the example in which the container is the MP4 (ISOBMFF) has been described in the embodiments described above. However, the container is not limited to the MP4 in the present technology, and the present technology can be similarly applied to a case where the container is in other formats such as MPEG-2 TS and MMT.

Furthermore, the present technology can also take the following configurations.

(1) A server device, including:
an imaging unit that captures an image of a subject to obtain image data; and
a transmission unit that transmits a container in a predetermined format including a video stream configured by the image data to a client device, in which
capture information indicating an imaging state in the imaging unit is inserted in a layer of the video stream and/or a layer of the container.

(2) The server device according to (1), in which
the capture information includes information regarding an imaging direction of the imaging unit.

(3) The server device according to (1) or (2), in which
the capture information includes information regarding a focus distance of the imaging unit.

(4) The server device according to any one of (1) to (3), in which
the capture information includes information regarding a zoom ratio of the imaging unit.

(5) The server device according to any one of (1) to (4), in which
position information indicating a position of the server device of its own is further inserted in the layer of the video stream and/or the layer of the container.

(6) The server device according to (5), in which the position information is GPS data.

(7) The server device according to (5) or (6), in which
identification information for identifying a combination of the capture information and the position information and identification information for identifying the server device of its own are further inserted in the layer of the video stream and/or the layer of the container.

(8) The server device according to any one of (1) to (7), further including:
a reception unit that receives control information for controlling the imaging state in the imaging unit from the client device; and
a control unit that controls the imaging state of the imaging unit on the basis of the control information.

(9) A method of transmission processing of a server device, including:
an imaging step of capturing an image of a subject to obtain image data with an imaging unit; and
a transmitting step of transmitting, to a client device, a container in a predetermined format including a video stream configured by the image data using a transmission unit, in which capture information indicating an imaging state in the imaging unit is inserted in a layer of the video stream and/or a layer of the container.

(10) A client device, including:

a reception unit that receives a container in a predetermined format including a video stream from a server device, the video stream including image data obtained by imaging a subject with an imaging unit, capture information indicating an imaging state of the imaging unit being inserted in a layer of the video stream and/or a layer of the container, the client device further including:

a control unit that controls processing for obtaining display image data from the video stream, processing for displaying the imaging state of the imaging unit on the basis of the capture information, processing for obtaining control information regarding the imaging state of the imaging unit in response to a user operation using a display of the imaging state, and processing for transmitting the control information to the server device.

(11) The client device according to (10), in which position information indicating a position of the server device is further inserted in the layer of the video stream and/or the layer of the container, and the control unit further controls processing for obtaining access information for accessing another server device different from the server device on the basis of the user operation and processing for accessing the other server device on the basis of the access information.

(12) The client device according to (11), in which the access information is an URL of the other server device.

(13) The client device according to (11), in which the access information is the position information and an URL of a conversion server that converts the position information into an URL.

(14) A method of reception processing of a client device, the method including:

a receiving step of receiving, from a server device, a container in a predetermined format including a video stream using a reception unit, the video stream including image data obtained by imaging a subject with an imaging unit, capture information indicating an imaging state of the imaging unit being inserted in a layer of the video stream and/or a layer of the container, the method further including:

a controlling step of controlling, with a control unit, processing for obtaining display image data from the video stream, processing for displaying the imaging state of the imaging unit on the basis of the capture information, processing for obtaining control information regarding the imaging state of the imaging unit in response to a user operation using a display of the imaging state, and processing for transmitting the control information to the server device.

(15) A server system in which a plurality of server devices and client devices are mutually connected via a network, in which the server device includes:

an imaging unit that captures an image of a subject to obtain image data; and a transmission unit that transmits a container in a predetermined format including a video stream configured by the image data to the client device, capture information indicating an imaging state in the imaging unit is inserted in a layer of the video stream and/or a layer of the container, the client device includes:

a reception unit that receives the container in the predetermined format from the server device, and the client device further includes:

a control unit that controls processing for obtaining display image data from the video stream, processing for displaying the imaging state of the imaging unit on the basis of the capture information, processing for obtaining control information regarding the imaging state of the imaging unit in response to a user operation using a display of the imaging state, and processing for transmitting the control information to the server device.

(16) The server system according to (15), in which position information indicating a position of the server device is further inserted in the layer of the video stream and/or the layer of the container, and the control unit further controls processing for obtaining access information for accessing another server device different from the server device on the basis of the user operation and processing for accessing the other server device on the basis of the access information.

(17) A server device, including:

a storage that stores a plurality of video streams identified by capture device identification information for identifying an imaging device and capture view identification information for identifying a combination of a position information of the imaging device and imaging state information of the imaging device;

a reception unit that receives a reproduction request in which a video stream to be reproduced is specified by the capture device identification information and the capture view identification information from a client device; and a transmission unit that reads the specified video stream from the storage and transmits a container in a predetermined format including the video stream to the client device.

(18) A client device, including:

a transmission unit that transmits, to a server device, a reproduction request in which a video stream to be reproduced is specified by capture device identification information for identifying an imaging device and capture view identification information for identifying a combination of a position information of the imaging device and imaging state information of the imaging device;

a reception unit that receives a container in a predetermined format including a video stream corresponding to the reproduction request from the server device; and a processing unit that obtains display image data from the video stream included in the container.

The main feature of the present technology is that the media capture/location server inserts the capture information indicating the imaging state of the camera (imaging unit) into the layer of the video stream and/or the layer of the container and transmits the same so that the client device can easily grasp the imaging state (e.g., imaging direction, focus distance, and zoom ratio) of the camera (imaging unit) in the media capture/location server on the basis of the capture information, whereby the imaging state of the media capture/location server can be appropriately controlled (see FIGS. 1, 11, and 13).

REFERENCE SIGNS LIST 10, 30 Server system
101 Media capture/location server
102 Initial access server
103 GPS_URL mapping server
111 Controller
112 Locator
113 Capture
114 Video encoder
115 Container encoder
116 Network interface
117 Bus
200 Client device
211 Controller
212 User operation unit
213 Message converter
214 Network interface
215 Container decoder
216 Video decoder
217 Video processor
218 Display
219 Bus
301 Media capture/location server
302 Initial server
303 Thumbnail
304 Storage server
311 Controller
312 Storage
313 Container encoder
314 Network interface
315 Bus

The invention claimed is:

1. A server device, comprising:
a camera configured to capture an image of a subject to obtain image data; and
circuitry configured to
transmit a container in a predetermined format including a video stream of the image data to a client device, capture information indicating an imaging state in the camera being inserted in a layer of the video stream and/or a layer of the container,
receive control information that is obtained in response to a user operation via a user interface, the user interface being displayed according to the imaging state of the camera that is indicated by the capture information inserted in the layer of the video stream and/or the layer of the container, and
change a setting of the imaging state of the camera based on the received control information.

2. The server device according to claim 1, wherein the capture information includes information regarding an imaging direction of the camera.

3. The server device according to claim 1, wherein the capture information includes information regarding a focus distance of the camera.

4. The server device according to claim 1, wherein the capture information includes information regarding a zoom ratio of the camera.

5. The server device according to claim 1, wherein position information indicating a position of the server device is further inserted in the layer of the video stream and/or the layer of the container.

6. The server device according to claim 5, wherein the position information is GPS data.

7. The server device according to claim 5, wherein identification information for identifying a combination of the capture information and the position information and identification information for identifying the server device are further inserted in the layer of the video stream and/or the layer of the container.

8. The server device according to claim 1, wherein the capture information indicating the imaging state is inserted in a supplemental enhancement information message of the video stream and/or a user data box of the container.

9. A client device, comprising:
reception circuitry configured to receive a container in a predetermined format including a video stream from a server device, the video stream including image data obtained by imaging a subject with a camera, and capture information indicating an imaging state of the camera being inserted in a layer of the video stream and/or a layer of the container; and
processing circuitry configured to
obtain display image data from the video stream,
display a user interface according to the imaging state of the camera that is indicated by the capture information inserted in the layer of the video stream and/or the layer of the container,
obtain control information to change a setting of the imaging state of the camera in response to a user operation via the user interface, and
transmit the control information to the server device.

10. The client device according to claim 9, wherein position information indicating a position of the server device is further inserted in the layer of the video stream and/or the layer of the container, and
the processing circuitry is configured to obtain access information for accessing another server device different from the server device based on the user operation and processing for accessing the other server device based on the access information.

11. The client device according to claim 10, wherein the access information is an URL of the other server device.

12. The client device according to claim 10, wherein the access information is the position information and an URL of a conversion server that converts the position information into an URL.

13. A client device, comprising:
circuitry configured to
transmit, to a server device, a reproduction request in which a first video stream to be reproduced is specified by capture device identification information for identifying an imaging device and capture view identification information selected by a user for identifying a combination of a position information of the imaging device and imaging state information of the imaging device, the capture view identification information being inserted in a layer of a second video stream and/or a layer of a container of the second video stream, and the imaging state information indicating a plurality imaging state settings for the imaging device;
receive a container in a predetermined format including a video stream corresponding to the reproduction request from the server device; and
obtain display image data from the video stream included in the container.

* * * * *